US012589873B2

(12) United States Patent
Weaver

(10) Patent No.: US 12,589,873 B2
(45) Date of Patent: Mar. 31, 2026

(54) RADIANT FLOOR PANELS FOR CARGO HEATING

(71) Applicant: The Boeing Company, Arlington, VA (US)

(72) Inventor: Chay Philip Weaver, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 397 days.

(21) Appl. No.: 18/152,374

(22) Filed: Jan. 10, 2023

(65) Prior Publication Data

US 2024/0228039 A1 Jul. 11, 2024

(51) Int. Cl.
B64D 13/08 (2006.01)
B64D 9/00 (2006.01)
F24D 13/02 (2006.01)
H05B 1/02 (2006.01)

(52) U.S. Cl.
CPC ............. B64D 9/00 (2013.01); F24D 13/024 (2013.01); H05B 1/0236 (2013.01)

(58) Field of Classification Search
CPC ... H05B 3/286; H05B 2203/003; Y02T 50/40; Y02T 50/50
See application file for complete search history.

(56) References Cited

U.S. PATENT DOCUMENTS

| | | | | |
|---|---|---|---|---|
| 2005/0098684 A1* | 5/2005 | Gullerud | | B64D 13/08 |
| | | | | 244/129.1 |
| 2006/0219842 A1* | 10/2006 | Shell | | B64D 13/06 |
| | | | | 244/118.5 |
| 2010/0012781 A1* | 1/2010 | Cazals | | B64C 1/0683 |
| | | | | 244/119 |
| 2010/0107661 A1* | 5/2010 | Awwad | | B60H 1/3232 |
| | | | | 700/275 |
| 2011/0277443 A1* | 11/2011 | Pereira | | B64D 15/00 |
| | | | | 60/39.093 |
| 2011/0299470 A1* | 12/2011 | Muller | | H04Q 9/00 |
| | | | | 370/328 |
| 2015/0097399 A1 | 4/2015 | Vue | | |
| 2016/0121993 A1 | 5/2016 | Nehring | | |
| 2020/0391850 A1* | 12/2020 | St. Rock | | H02J 7/1446 |
| 2021/0323779 A1* | 10/2021 | Sjostrom | | B65G 54/02 |
| 2023/0068594 A1* | 3/2023 | Ocejo Rodriguez | .. | B64D 13/08 |
| 2024/0174361 A1* | 5/2024 | Panjer | | B64D 11/0007 |

FOREIGN PATENT DOCUMENTS

| | | | |
|---|---|---|---|
| CN | 104260891 B | * | 8/2016 |
| FR | 3047545 A1 | * | 8/2017 |

OTHER PUBLICATIONS

EP Search Report mailed Mar. 11, 2024 in re EP Application No. 23208727.0.

* cited by examiner

*Primary Examiner* — Santosh R Poudel

(74) *Attorney, Agent, or Firm* — COATS & BENNETT, PLLC

(57) ABSTRACT

Methods, systems, and apparatuses for controlling climate in aircraft cargo compartments are disclosed, with aircraft cargo compartment floor panels configured to deliver heat and maintain selected temperatures in the floor panels in response to a determined phase of flight of an aircraft.

20 Claims, 23 Drawing Sheets

300

MONITORING FLOOR PANEL TEMPERATURE — 302

DETERMINING PHASE OF FLIGHT — 304

ACTIVATING FLOOR PANEL
HEATING ELEMENT — 306

MAINTAINING FLOOR PANEL AT
SELECTED TEMPERATURE AND/OR
WITHIN SELECTED TEMPERATURE RANGE — 308

500

MONITORING FLOOR PANEL TEMPERATURE — 302

DETERMINE PHASE OF FLIGHT — 304

ACTIVATING FLOOR PANEL HEATING ELEMENT — 306

ALTERING FLOOR DETECTED TEMPERATURE TO SELECTED TEMPERATURE IN RESPONSE TO SELECTED/DETECTED FLIGHT PHASE — 502

MAINTAINING FLOOR PANEL AT SELECTED TEMPERATURE AND/OR WITHIN SELECTED TEMPERATURE RANGE — 308

600

MONITORING FLOOR PANEL TEMPERATURE — 302

DETERMINE PHASE OF FLIGHT — 304

DETECTING CHANGE IN FLOOR INTIAL
TEMPERATURE DURING DETECTED
PHASE OF FLIGHT — 602

ACTIVATING FLOOR PANEL
HEATING ELEMENT — 306

MAINTAINING FLOOR PANEL AT
SELECTED TEMPERATURE AND/OR
WITHIN SELECTED TEMPERATURE RANGE
IN RESPONSE TO DETECTED
PHASE OF FLIGHT — 604

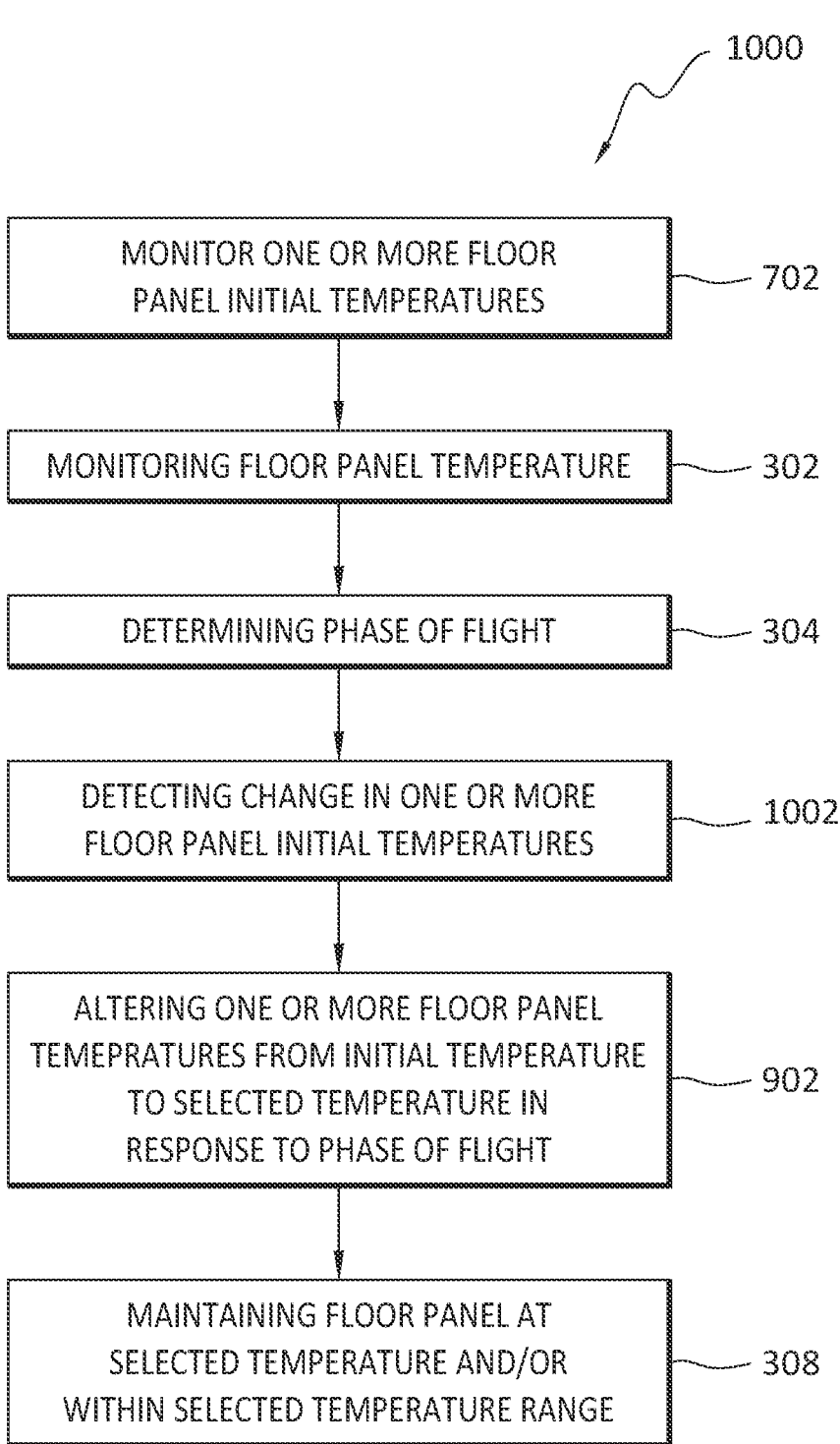

1000

MONITOR ONE OR MORE FLOOR PANEL INITIAL TEMPERATURES — 702

MONITORING FLOOR PANEL TEMPERATURE — 302

DETERMINING PHASE OF FLIGHT — 304

DETECTING CHANGE IN ONE OR MORE FLOOR PANEL INITIAL TEMPERATURES — 1002

ALTERING ONE OR MORE FLOOR PANEL TEMEPRATURES FROM INITIAL TEMPERATURE TO SELECTED TEMPERATURE IN RESPONSE TO PHASE OF FLIGHT — 902

MAINTAINING FLOOR PANEL AT SELECTED TEMPERATURE AND/OR WITHIN SELECTED TEMPERATURE RANGE — 308

FIG. 18

RADIANT FLOOR PANELS FOR CARGO HEATING

TECHNOLOGICAL FIELD

The present disclosure relates generally to the field of thermal conditions for cargo. More specifically the present disclosure relates to the field of maintaining selected thermal conditions for aircraft cargo in an aircraft.

BACKGROUND

Aircraft can be exposed to variations in temperature and pressure during air travel. Passenger cabins are typically pressurized and heated and/or cooled, as needed, to maintain passenger comfort. Cargo that is stored within an aircraft cargo bay (e.g., for passenger aircraft, typically located beneath a passenger cabin floor), is likewise subject to variations in temperature and pressure during typical flight operations. While cargo bays are also typically pressurized during flight, maintaining cargo temperature within a particular range to keep cargo from being subjected to temperature extremes (e.g., including cold temperatures that can range from about 0° F. to about 32° F.) has typically been accomplished by directing a heated airflow that traverses an airflow path from heaters or from sources of from available thermal sources that can include, for example, "bleed air" from engines, etc.

Unless explicitly identified as such, no statement herein is admitted as prior art merely by its inclusion in the Technological Field and/or Background section(s).

SUMMARY

Present aspects disclose apparatuses, systems, and methods for selectively detecting altering, and/or maintaining a plurality of thermal environments within an aircraft cargo bay, by at least selectively detecting altering, and/or maintaining temperatures of floor panels located within a cargo bay and/or cargo bay regions within an aircraft.

According to present aspects, a method is disclosed for controlling an aircraft cargo compartment climate, with the method including monitoring a first aircraft cargo compartment floor initial temperature of the first aircraft cargo compartment floor configured within an aircraft cargo bay, with the first aircraft cargo compartment floor including at least one first aircraft cargo compartment floor panel, with the first aircraft cargo compartment floor panel including a first aircraft cargo compartment floor panel initial temperature, and with the first aircraft cargo compartment floor panel further including a first aircraft cargo compartment floor panel heating element. The method further including determining a phase of flight of the aircraft to obtain a determined phase of flight, activating the first aircraft cargo compartment floor panel heating element in response to the determined phase of flight, with the first aircraft cargo compartment floor panel heating element in communication with the at least one first aircraft cargo compartment floor panel, and maintaining the first aircraft cargo compartment floor panel at a first aircraft cargo compartment floor panel selected temperature that is within a first aircraft cargo compartment floor selected temperature range In another aspect, the method further includes altering a first aircraft cargo compartment floor detected temperature to a temperature within the first aircraft cargo compartment floor selected temperature range.

In another aspect, the method further includes altering a first aircraft cargo compartment floor detected temperature to a temperature within the first aircraft cargo compartment floor selected temperature range in response to the determined phase of flight.

In a further aspect, the method further includes detecting a change in the first aircraft cargo compartment floor initial temperature during the determined phase of flight, and maintaining the first aircraft cargo compartment floor panel selected temperature to maintain the first aircraft cargo compartment selected temperature within the first aircraft cargo compartment selected temperature range in response to the determined phase of flight.

In another aspect, the method further includes monitoring a second aircraft cargo compartment floor initial temperature in a second aircraft cargo compartment configured within an aircraft cargo bay, with the second aircraft cargo compartment floor including at least one second aircraft cargo compartment floor panel, with the second aircraft cargo compartment floor panel including a second aircraft cargo compartment floor panel initial temperature, and with the second aircraft cargo compartment floor panel further including a second aircraft cargo compartment floor panel heating element. The method further includes activating the second aircraft cargo compartment floor panel heating element, with the second aircraft cargo compartment floor panel heating element in communication with the second aircraft cargo compartment floor panel, and altering the second aircraft cargo compartment floor panel initial temperature to a second aircraft cargo compartment floor panel selected temperature.

In another aspect, the method includes maintaining the second aircraft cargo compartment floor selected temperature of the second aircraft cargo compartment within a second aircraft cargo compartment floor selected temperature range.

In another aspect, the method further includes altering the second aircraft cargo compartment floor panel initial temperature to a second aircraft cargo compartment floor panel selected temperature in response to the determined phase of flight.

In another aspect, the method includes maintaining the second aircraft cargo compartment floor initial temperature in response to the determined phase of flight.

In another aspect, the method includes detecting a change in the second aircraft cargo compartment floor initial temperature during the determined phase of flight, and altering a detected second aircraft cargo compartment floor panel temperature to restore the second aircraft cargo compartment floor to the second aircraft cargo compartment floor panel initial temperature in response to the determined phase of flight.

In another aspect, the first aircraft cargo compartment floor panel selected temperature is different from the second aircraft cargo compartment floor panel selected temperature.

According to further present aspects, a system for regulating an aircraft cargo compartment floor temperature is disclosed, with the system including a first aircraft cargo compartment, with the first aircraft cargo compartment configured within an aircraft, with the first aircraft cargo compartment including at least one first aircraft cargo compartment floor region, with the at least one first aircraft cargo compartment floor region comprising at least one first aircraft cargo compartment floor panel, with the at least one first aircraft cargo compartment floor panel including an at least one first aircraft cargo compartment floor panel initial temperature, and with the at least one first aircraft cargo compartment floor panel further including an at least one first aircraft cargo compartment floor panel heating element. The first aircraft cargo compartment further includes a first aircraft cargo compartment floor temperature sensor, with the first aircraft cargo compartment floor temperature sensor in communication with the at least one first aircraft cargo compartment floor panel, a phase of flight sensor, with the phase of flight sensor configured to determine a phase of flight of the aircraft, a controller in communication with the at least one of the first aircraft cargo compartment floor panel, the phase of flight sensor, and the first aircraft cargo compartment floor temperature sensor. The system further includes a power source, with the power source in communication with the first aircraft cargo compartment floor panel heating element.

In another aspect, the system further includes a second aircraft cargo compartment configured within the aircraft, with the second aircraft cargo compartment including at least one second aircraft cargo compartment floor region, with the at least one second aircraft cargo compartment floor region including at least one second aircraft cargo compartment floor panel, with the at least one second aircraft cargo compartment floor panel including an at least one second aircraft cargo compartment floor panel initial temperature, and with the at least one second aircraft cargo compartment floor panel further comprising a second aircraft cargo compartment floor panel heating element. The second aircraft cargo compartment further includes a second aircraft cargo compartment floor temperature sensor, with the second aircraft cargo compartment sensor in communication with the at least one the second aircraft cargo compartment floor panel, wherein said controller is further in communication with at least one of the second aircraft cargo compartment floor panel, the phase of flight sensor, and the second aircraft cargo compartment floor sensor, and wherein the power source is further in communication with the at least one second aircraft cargo compartment floor panel heating element.

In another aspect, the system further includes a processor, with the processor in communication with said controller.

In another aspect, the processor is in communication with a readout.

In a further aspect, the processor is in communication with the controller.

In another aspect, the system is configured to maintain the at least one first aircraft cargo compartment initial temperature in response to the determined phase of flight.

In another aspect, the system is configured to maintain the at least one first aircraft cargo compartment floor panel initial temperature in response to the determined phase of flight, and the system is further configured to maintain the at least one second aircraft cargo compartment floor panel initial temperature in response to the determined phase of flight.

In another aspect, the first aircraft cargo compartment floor initial temperature is different from said second aircraft cargo compartment floor initial temperature.

In another aspect, the first aircraft cargo compartment further includes at least one partition, with the at least one partition configured to separate the first aircraft cargo compartment from the second aircraft cargo compartment.

A further present aspect discloses an aircraft including a first aircraft cargo compartment, with the first aircraft cargo compartment configured within an aircraft, with the first aircraft cargo compartment including at least one first aircraft cargo compartment floor region, with the at least one first aircraft cargo compartment floor region including at least one first aircraft cargo compartment floor panel, with the at least one first aircraft cargo compartment floor panel including an at least one first aircraft cargo compartment floor panel initial temperature, with and with the at least one first aircraft cargo compartment floor panel further including an at least one first aircraft cargo compartment floor panel heating element. The aircraft further includes a first aircraft cargo compartment floor temperature sensor, with the first aircraft cargo compartment floor temperature sensor in communication with the at least one first aircraft cargo compartment floor panel, a phase of flight sensor, with the phase of flight sensor configured to determine a phase of flight of the aircraft, a controller in communication with the at least one of the first aircraft cargo compartment floor panel, the phase of flight sensor, and the first aircraft cargo compartment floor temperature sensor. The aircraft further includes a power source, with the power source in communication the first aircraft cargo compartment floor panel heating element.

In another aspect, the aircraft further includes a second aircraft cargo compartment configured within the aircraft, with the second aircraft cargo compartment including at least one second aircraft cargo compartment floor region, with the at least one second aircraft cargo compartment floor region including at least one second aircraft cargo compartment floor panel, with the at least one second aircraft cargo compartment floor panel including an at least one second aircraft cargo compartment floor panel initial temperature, with the at least one second aircraft cargo compartment floor panel further including a second aircraft cargo compartment floor panel heating element. The aircraft further includes a second aircraft cargo compartment floor temperature sensor, with the second aircraft cargo compartment sensor in communication with the at least one the second aircraft cargo compartment floor panel, wherein the controller is further in communication with at least one of the second aircraft cargo compartment floor panel, the phase of flight sensor, and the second aircraft cargo compartment floor sensor, and wherein the power source is further in communication with the at least one second aircraft cargo compartment floor panel heating element.

In another aspect, the aircraft further comprises at least one partition, with the at least one partition configured to separate the first aircraft cargo compartment from the second aircraft cargo compartment.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
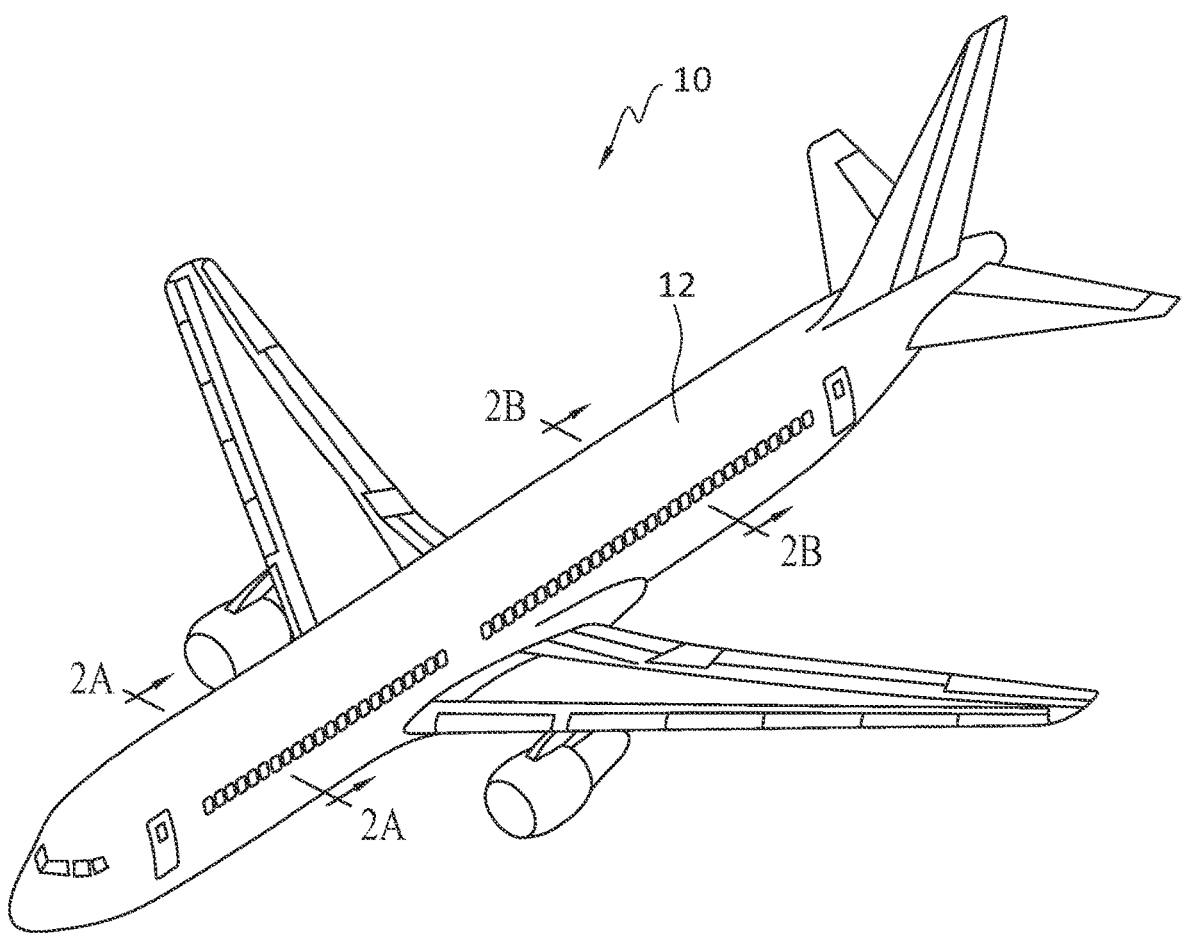
Figure 2A:
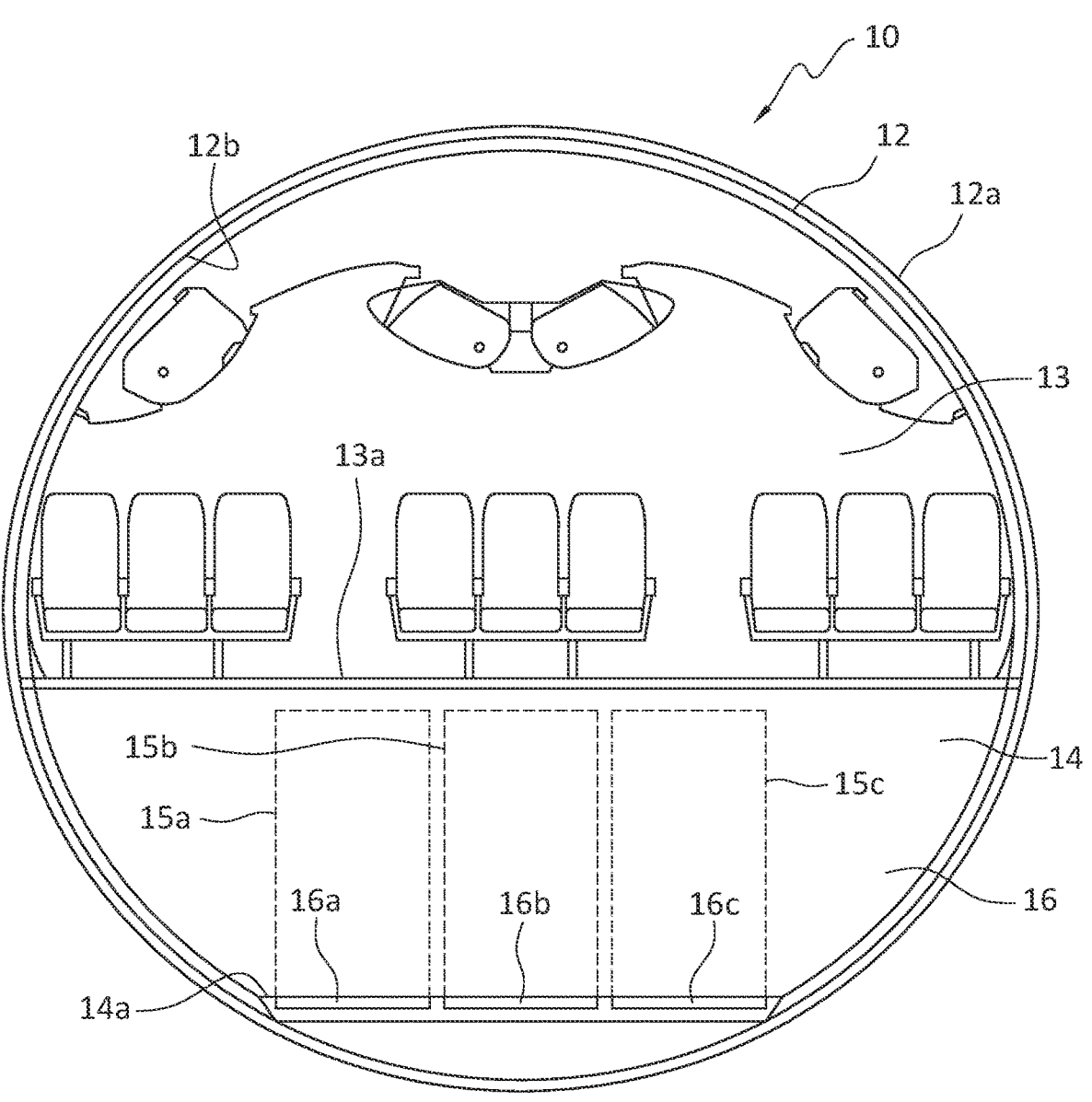
Figure 2B:
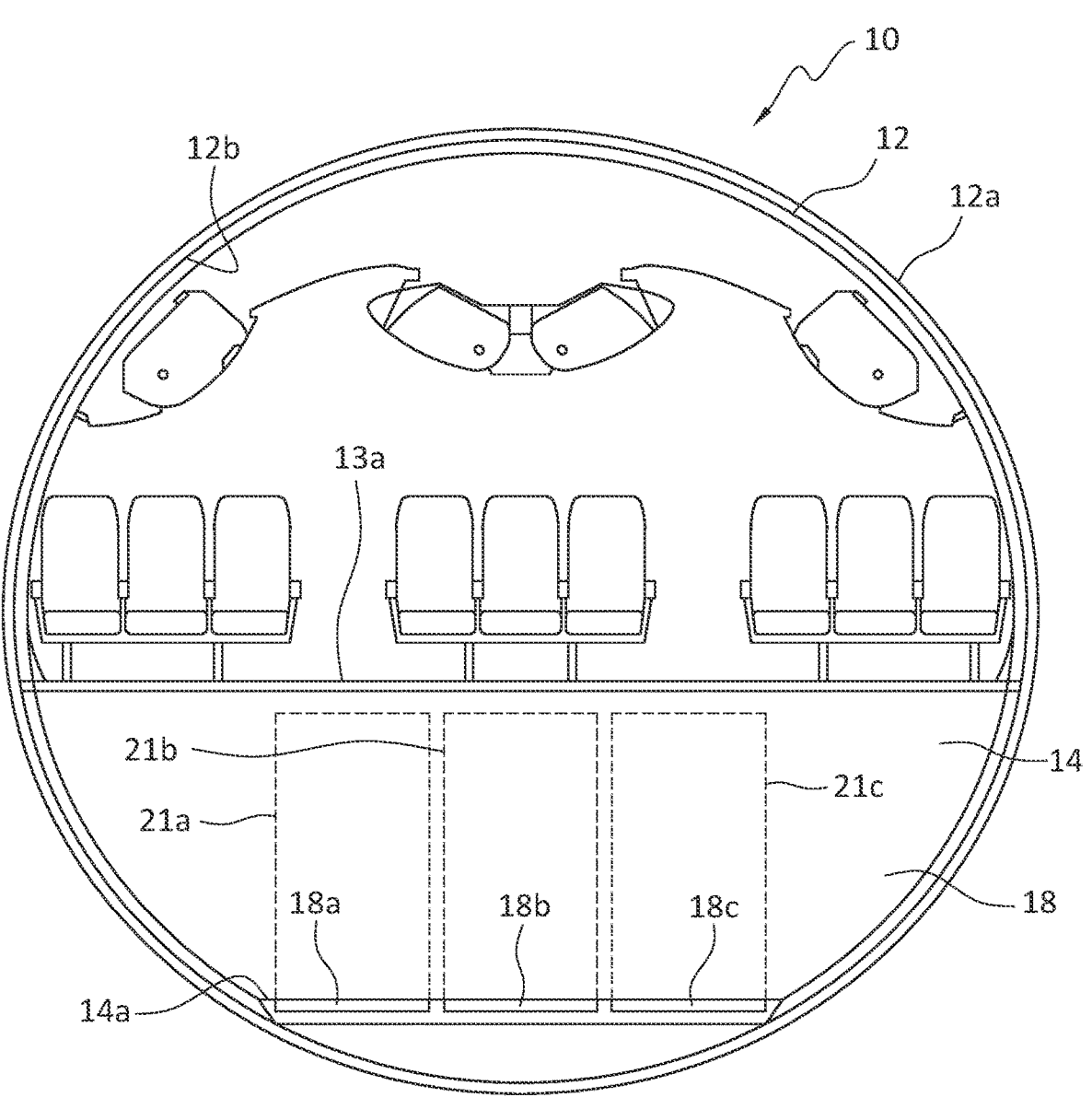
Figure 3:
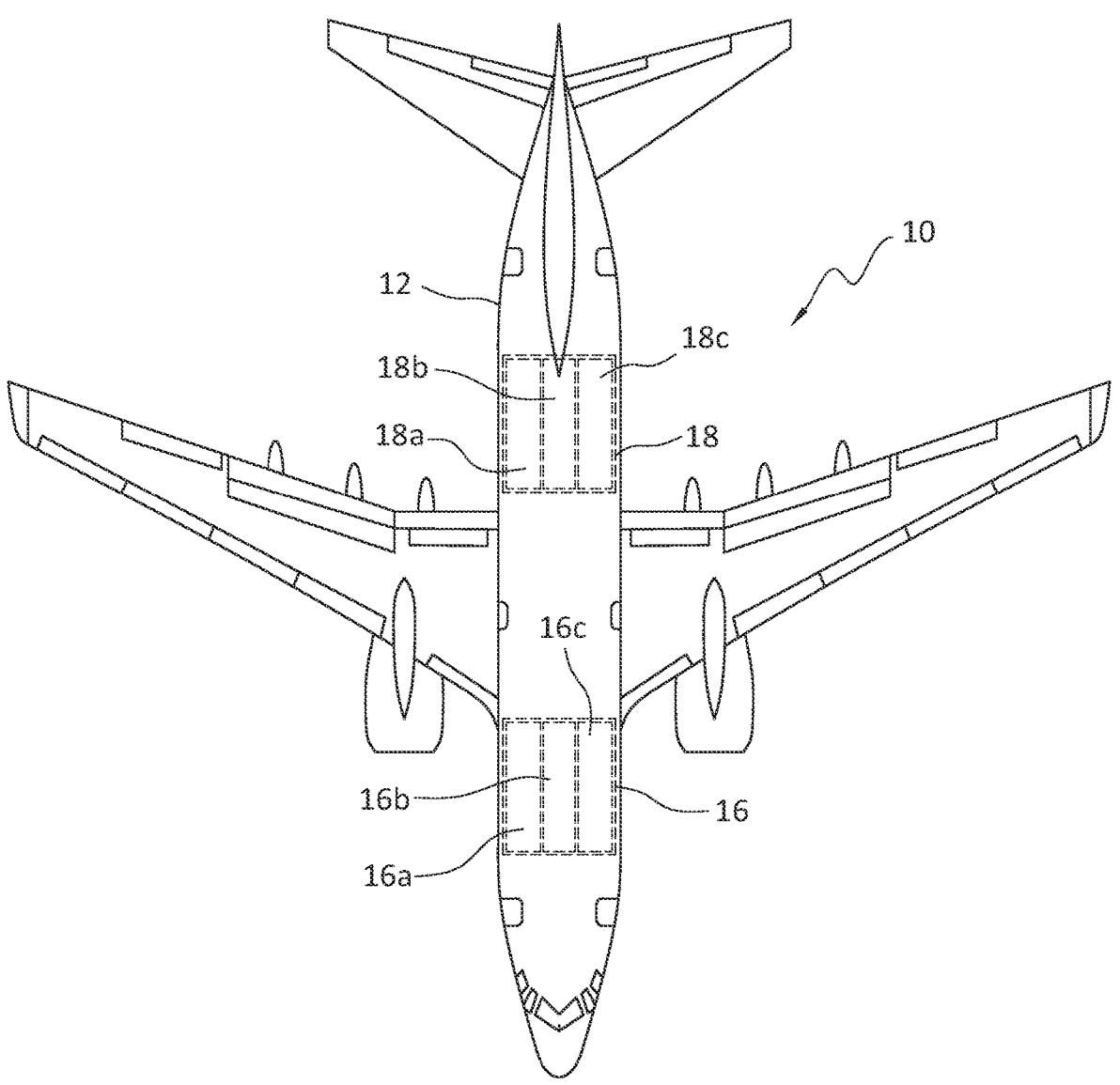
Figure 4A:
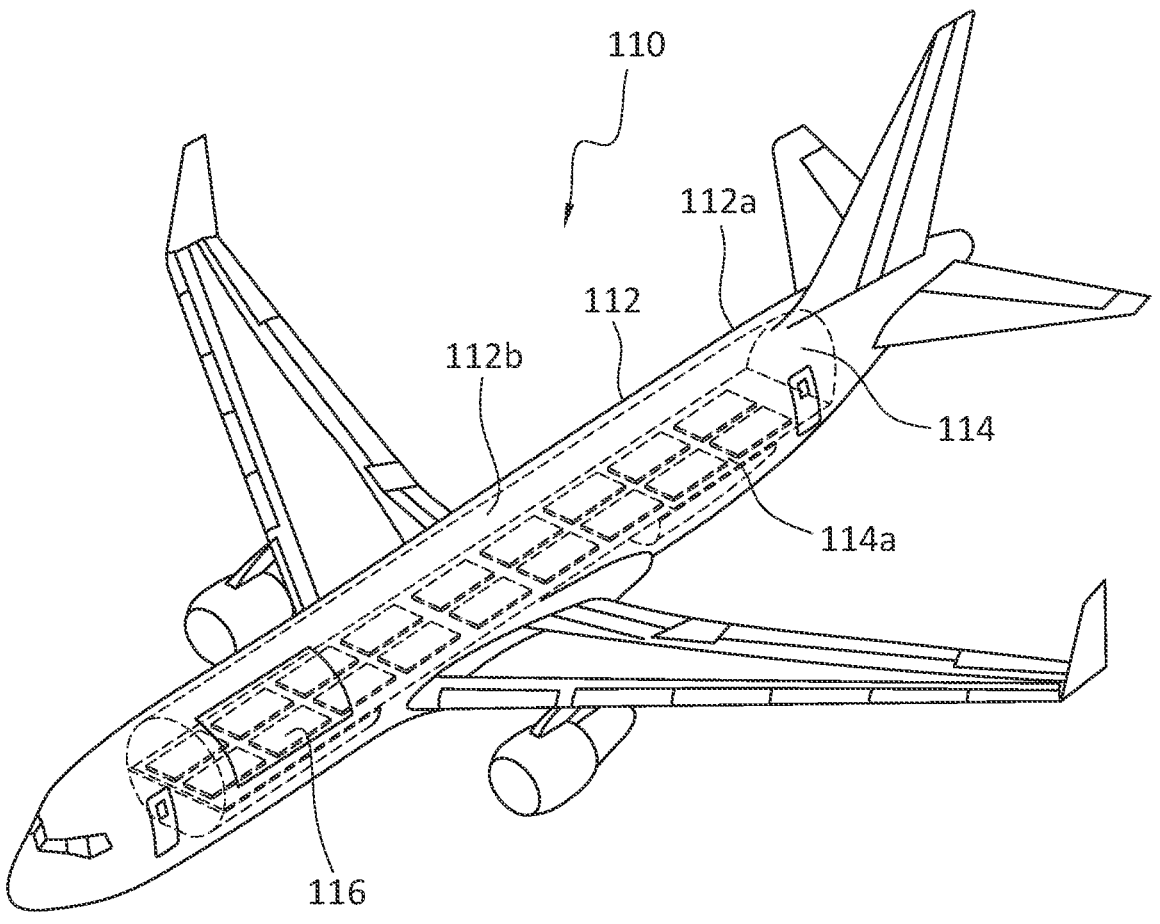
Figure 4B:
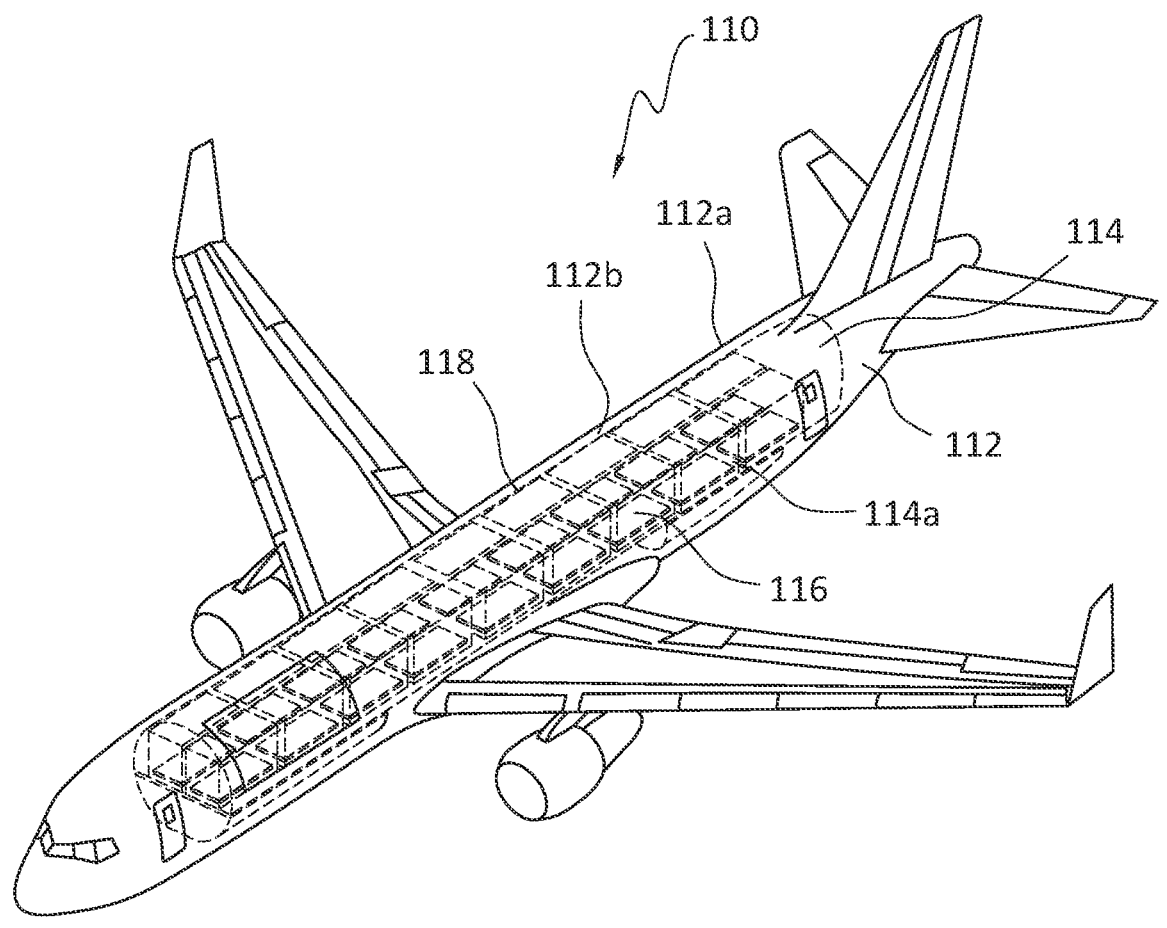
Figure 5:
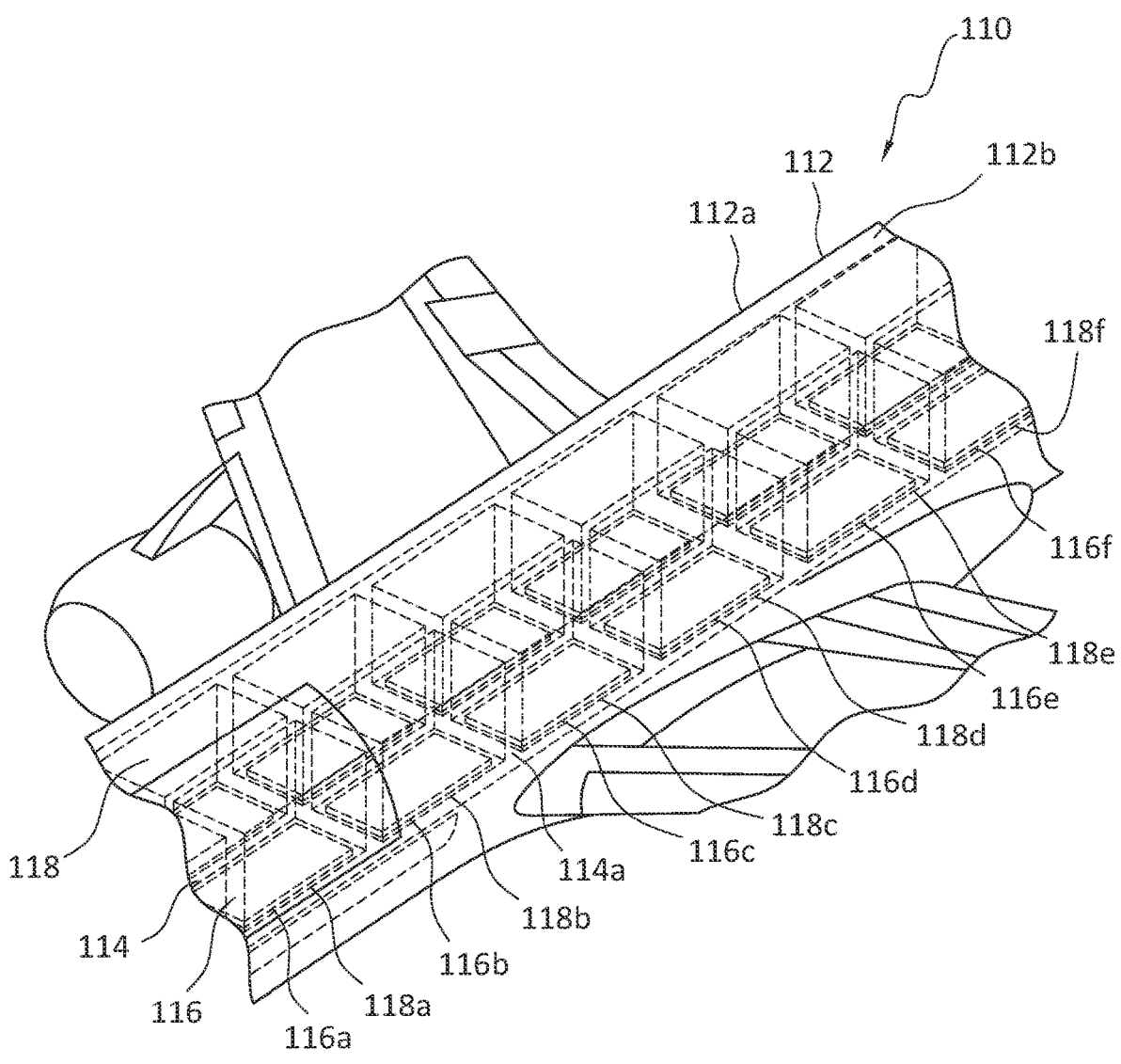
Figure 6A:
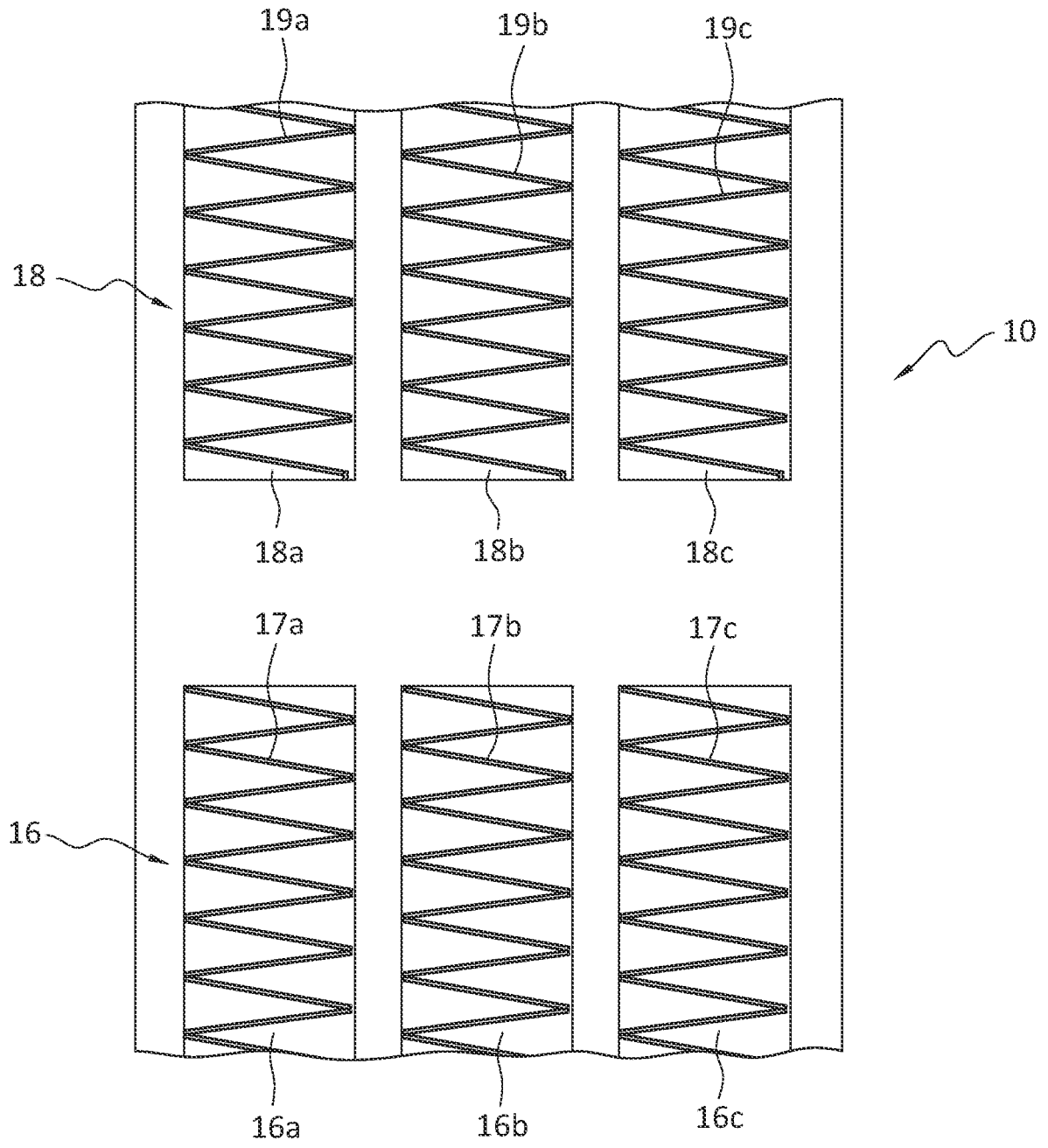
Figure 6B:
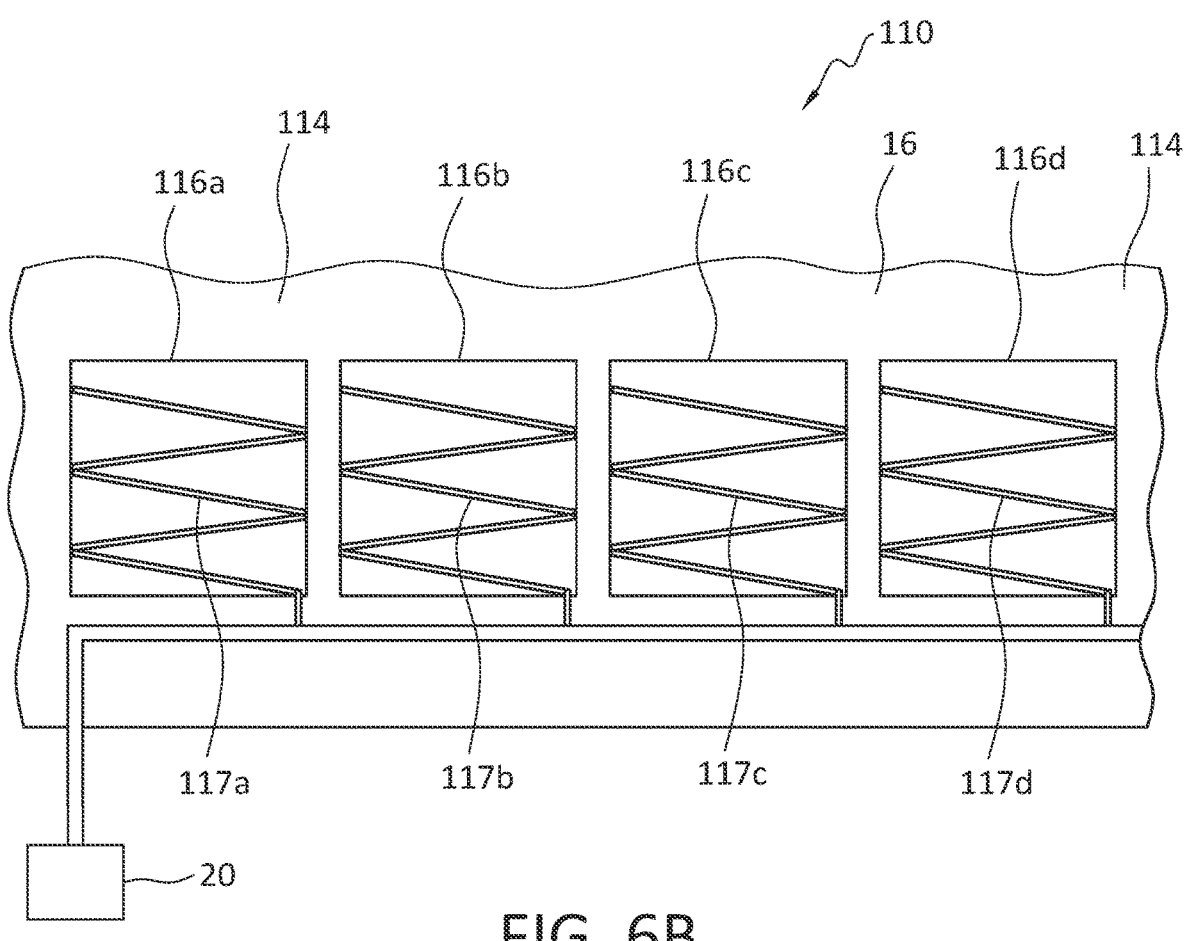
Figure 7:
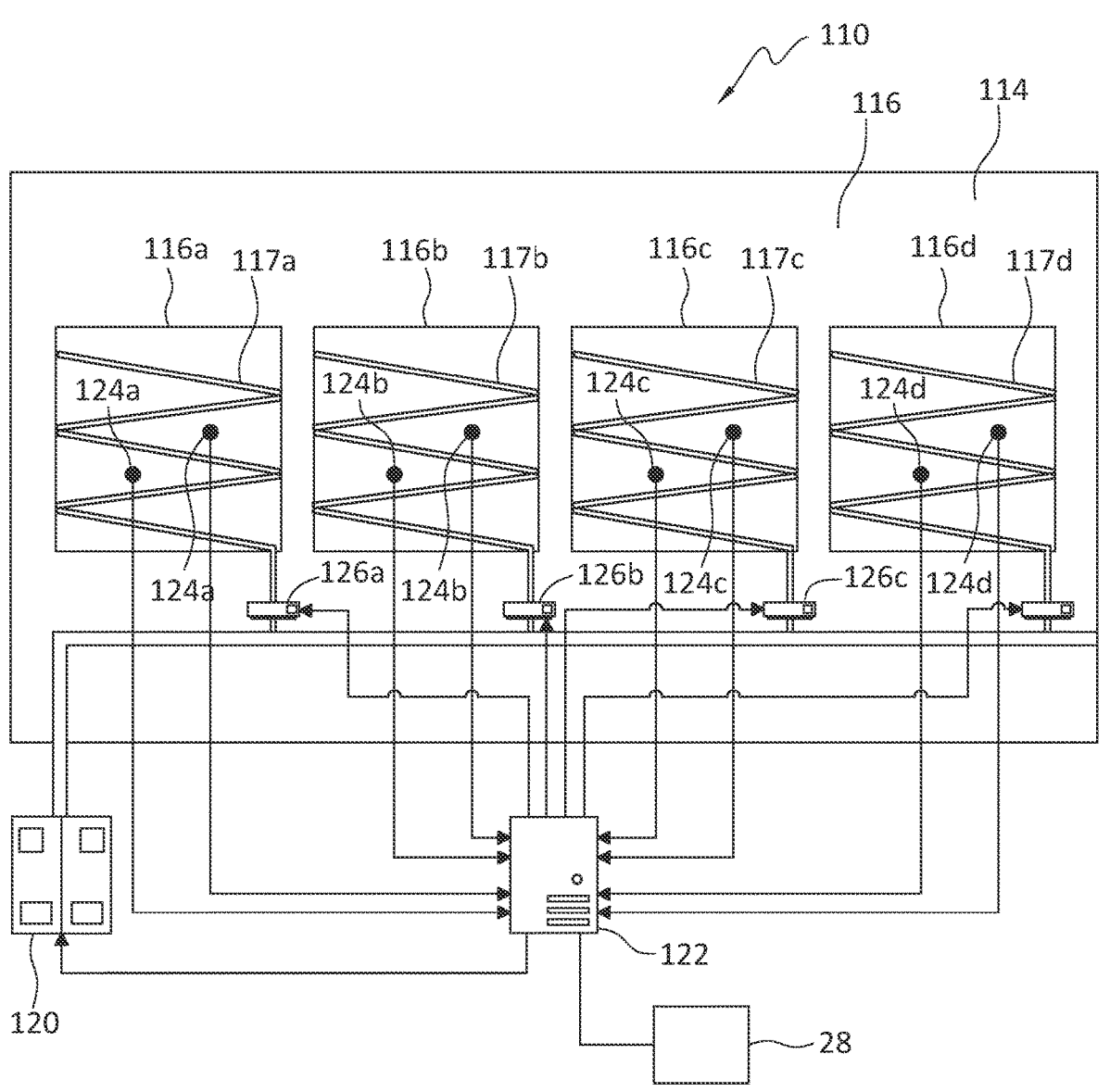
Figure 8:
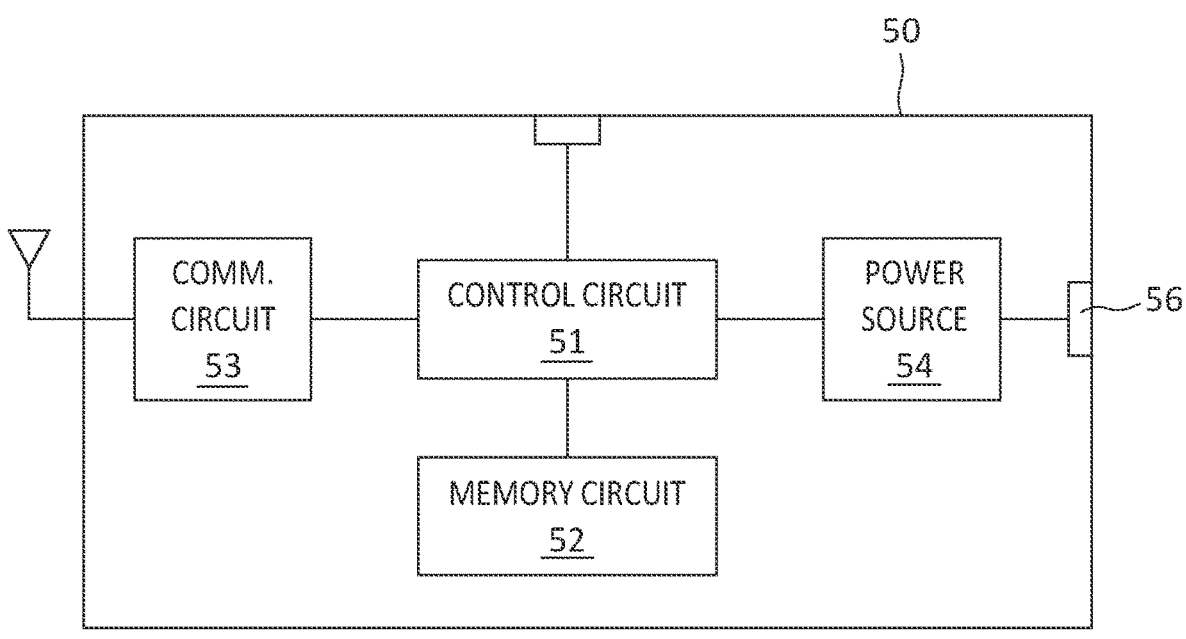
Figure 9:
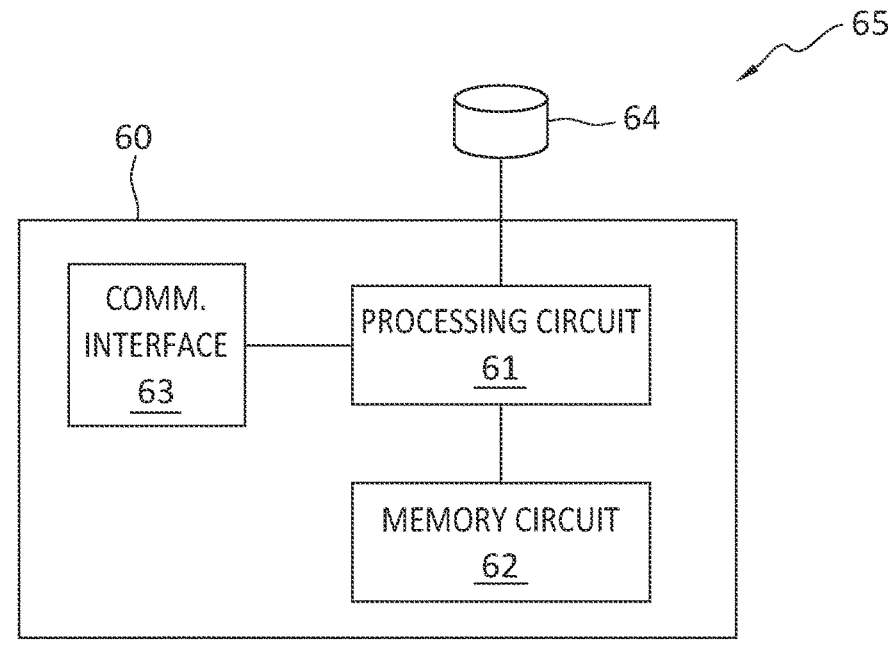
Figure 10:
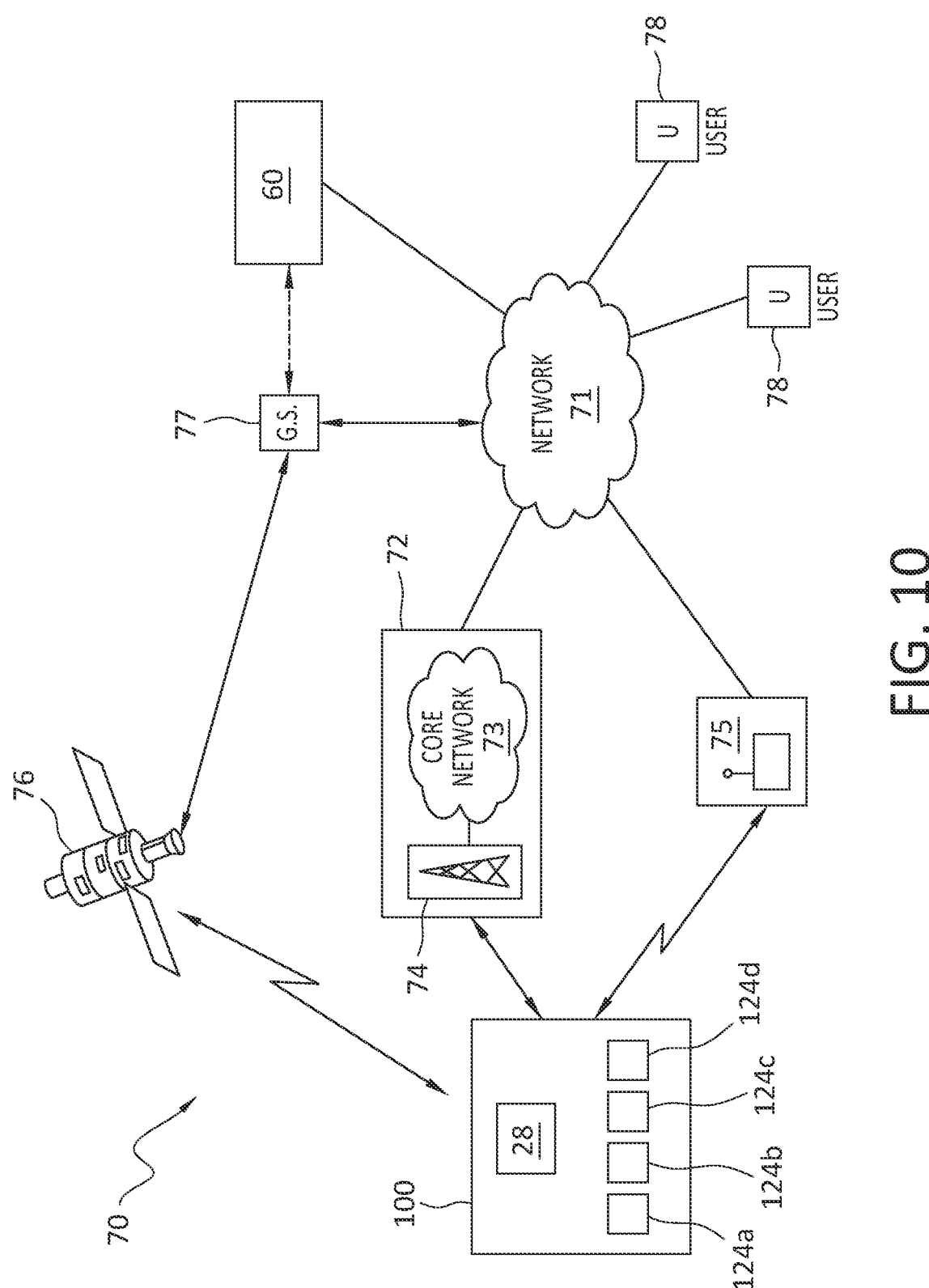
Figure 11:
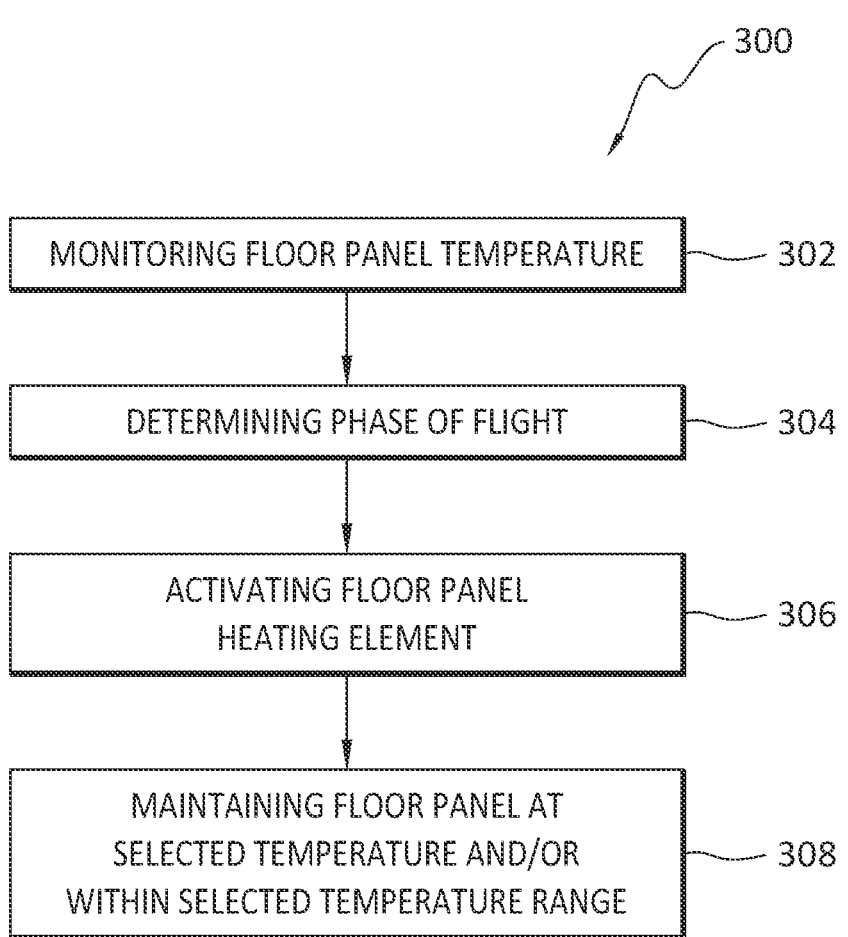
Figure 12:
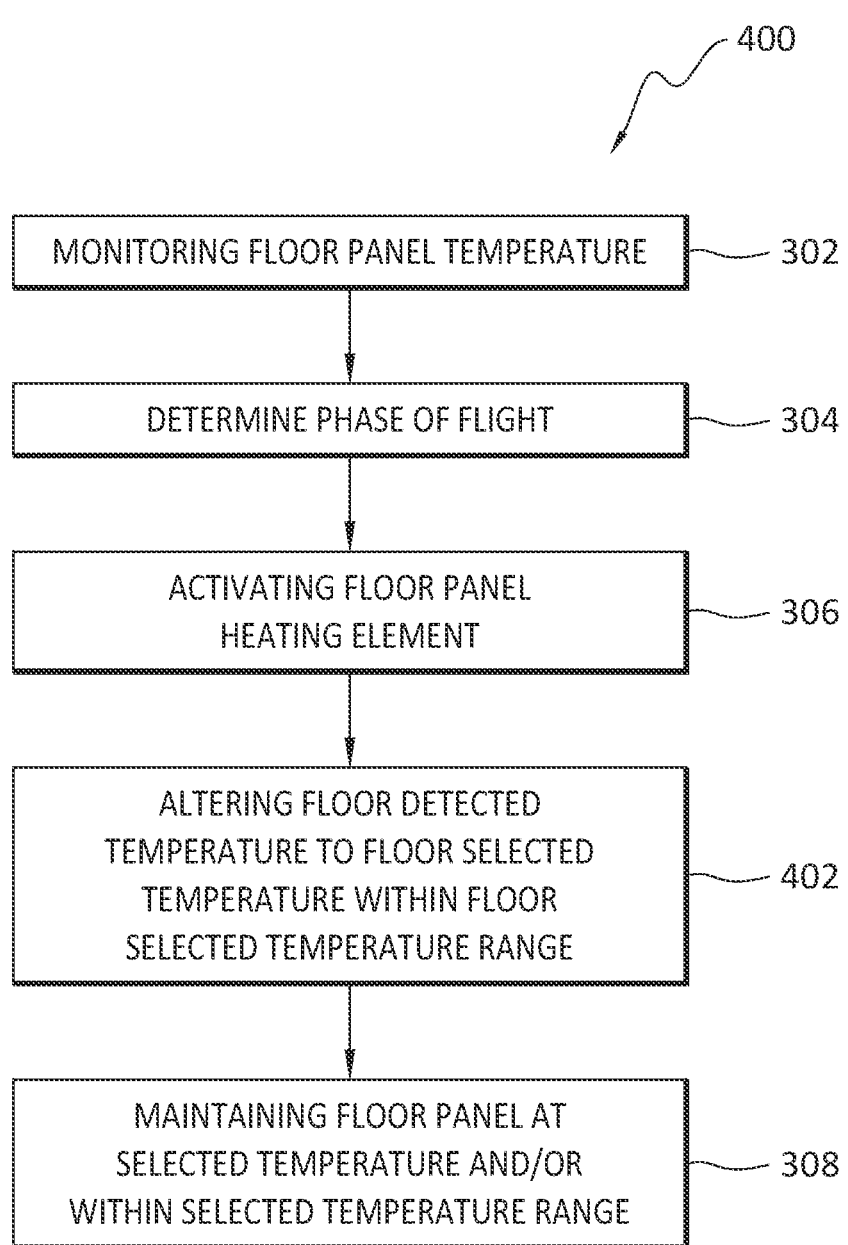
Figure 13:
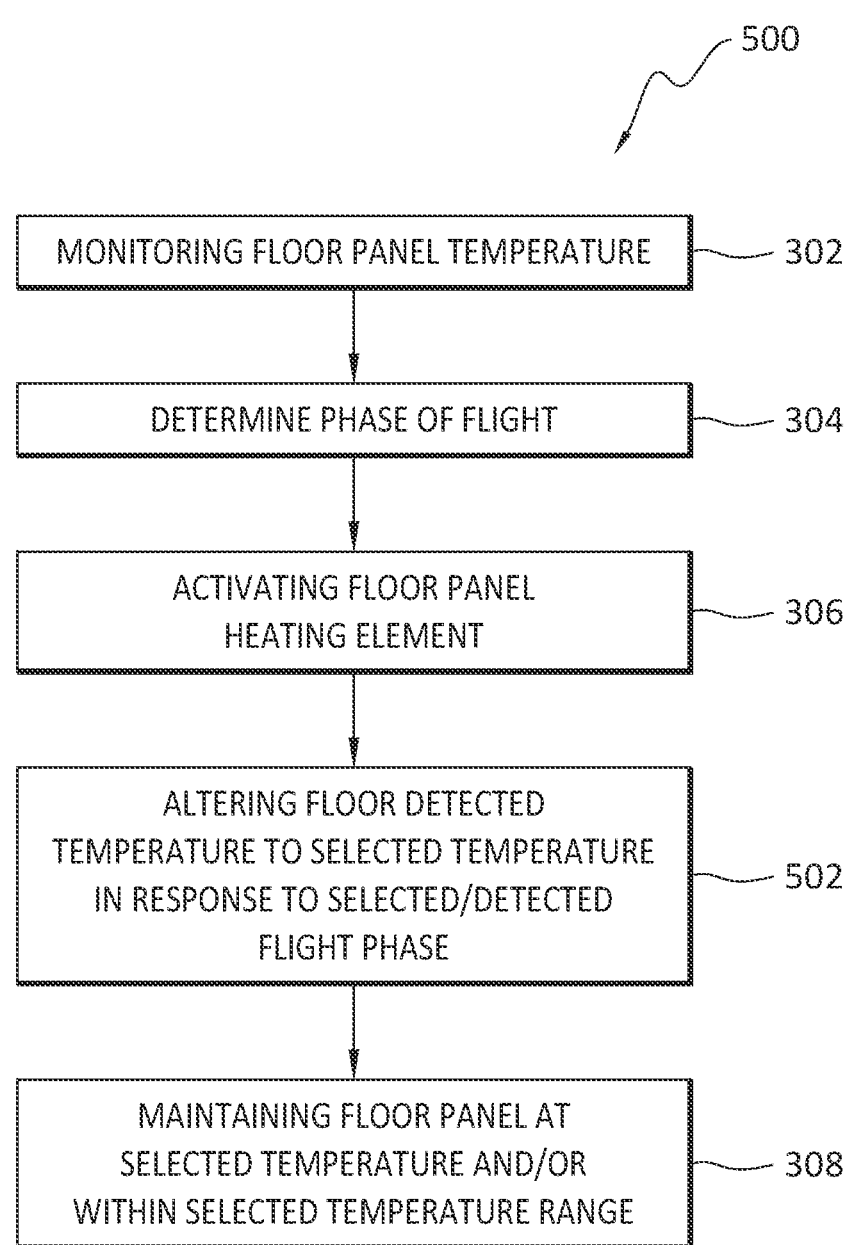
Figure 14:
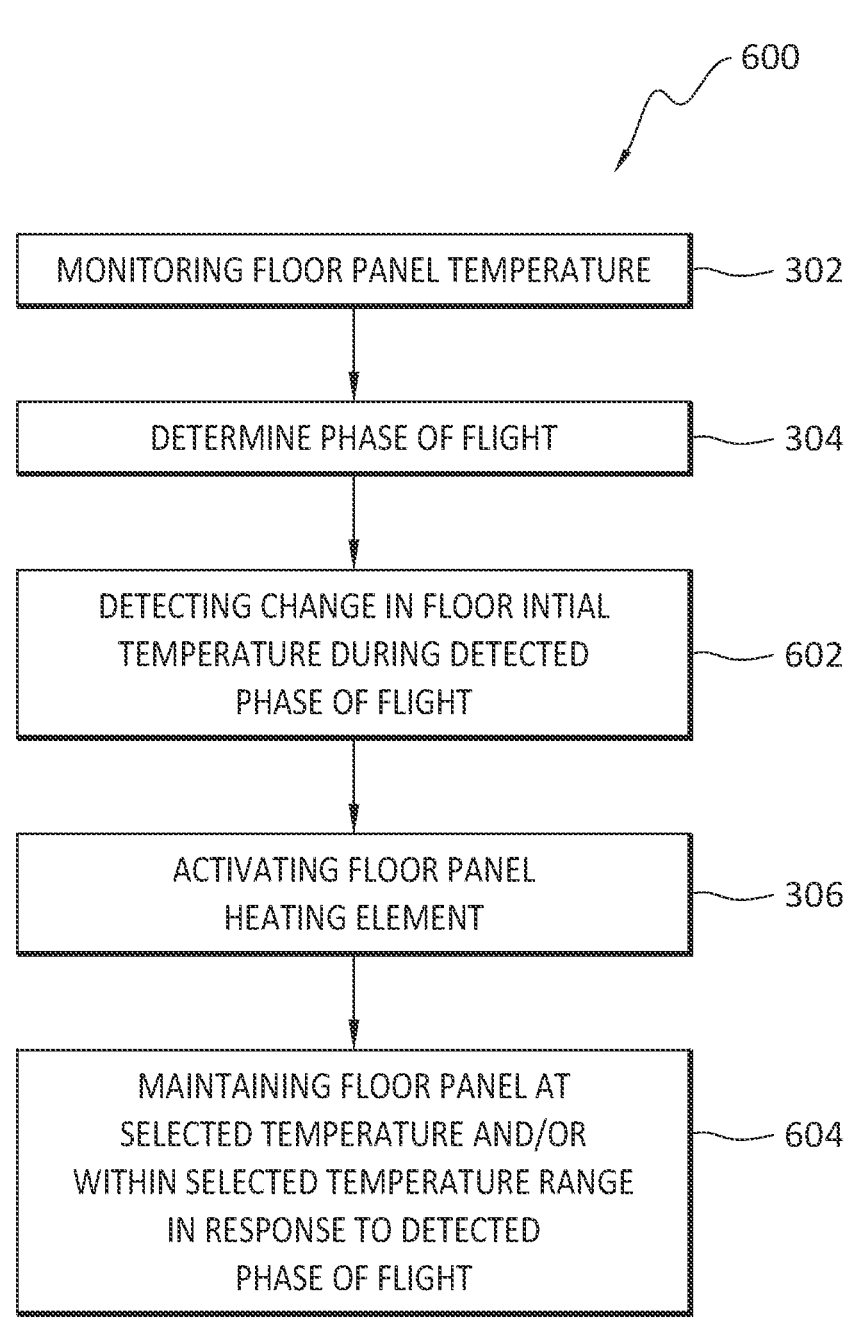
Figure 15:
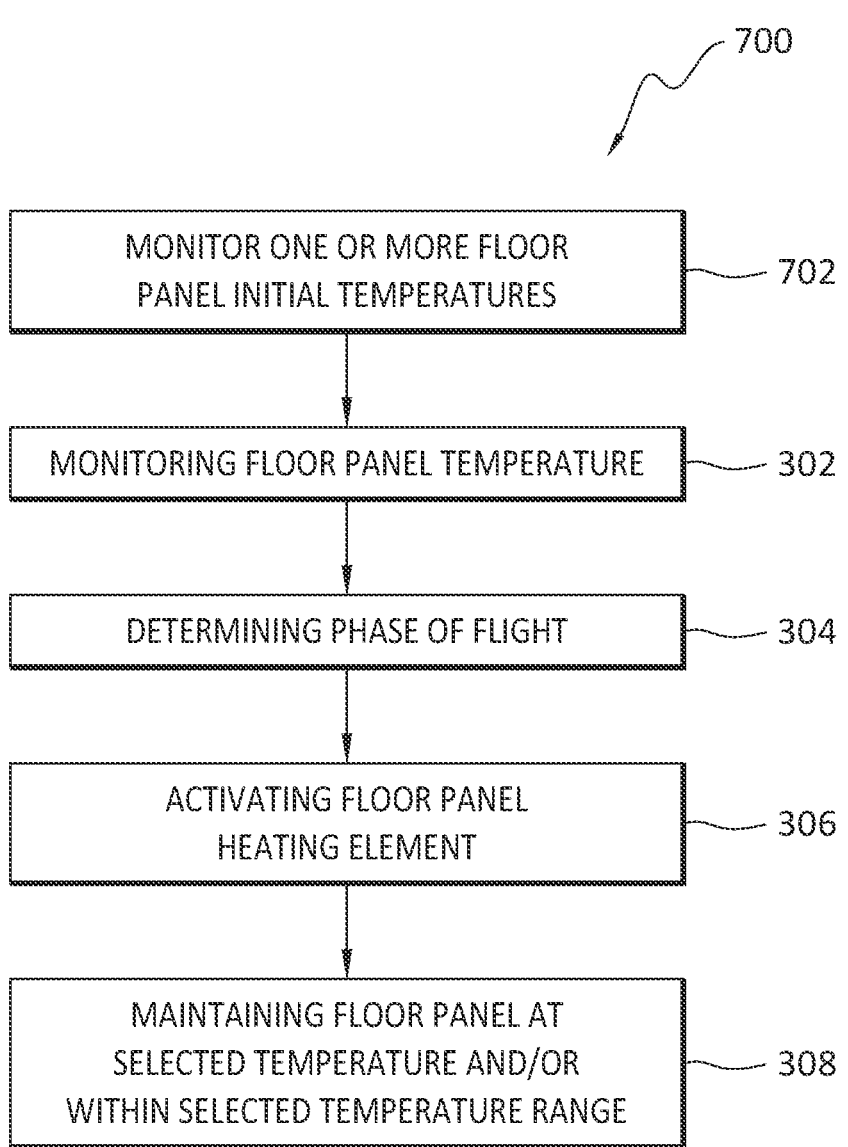
Figure 16:
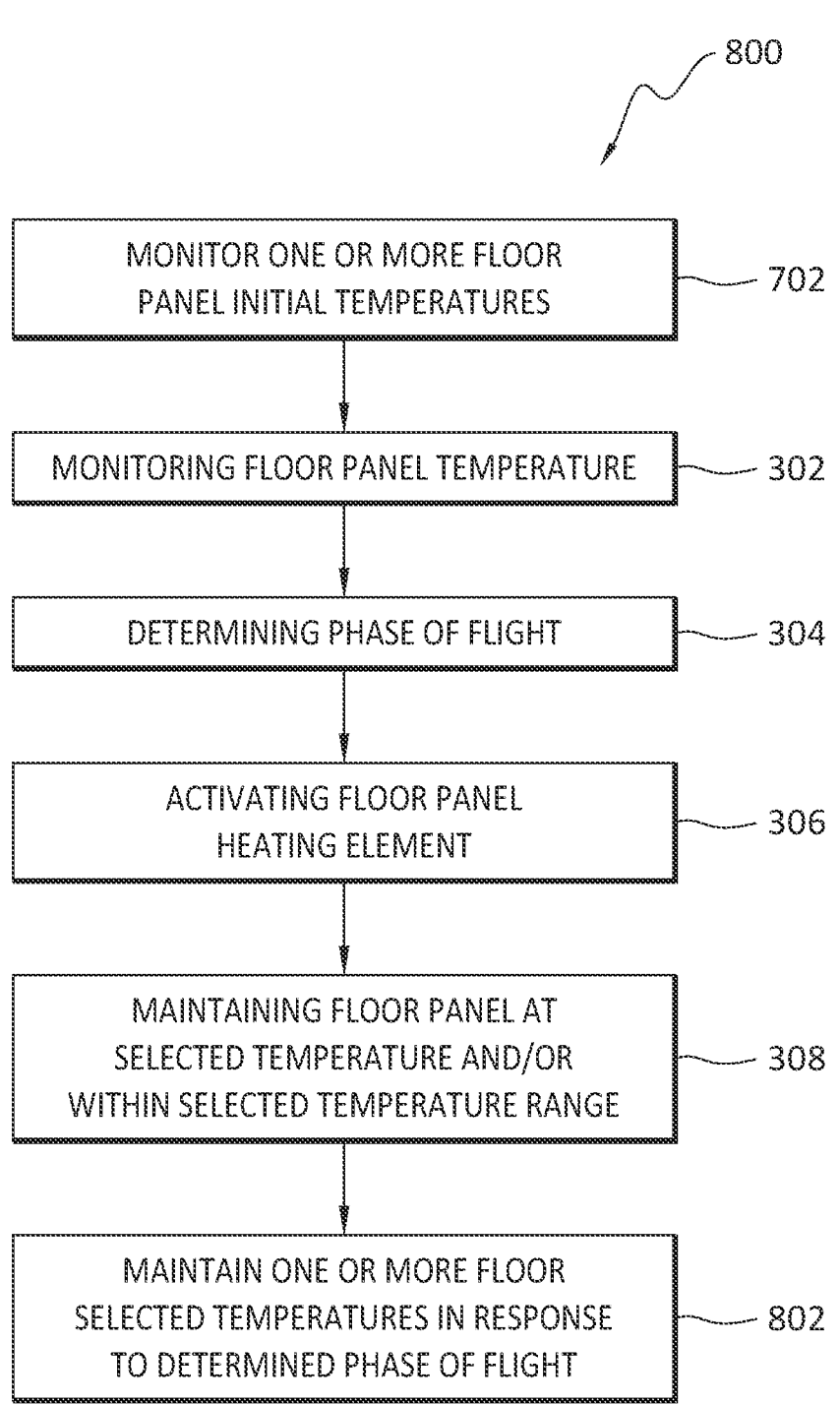
Figure 17:
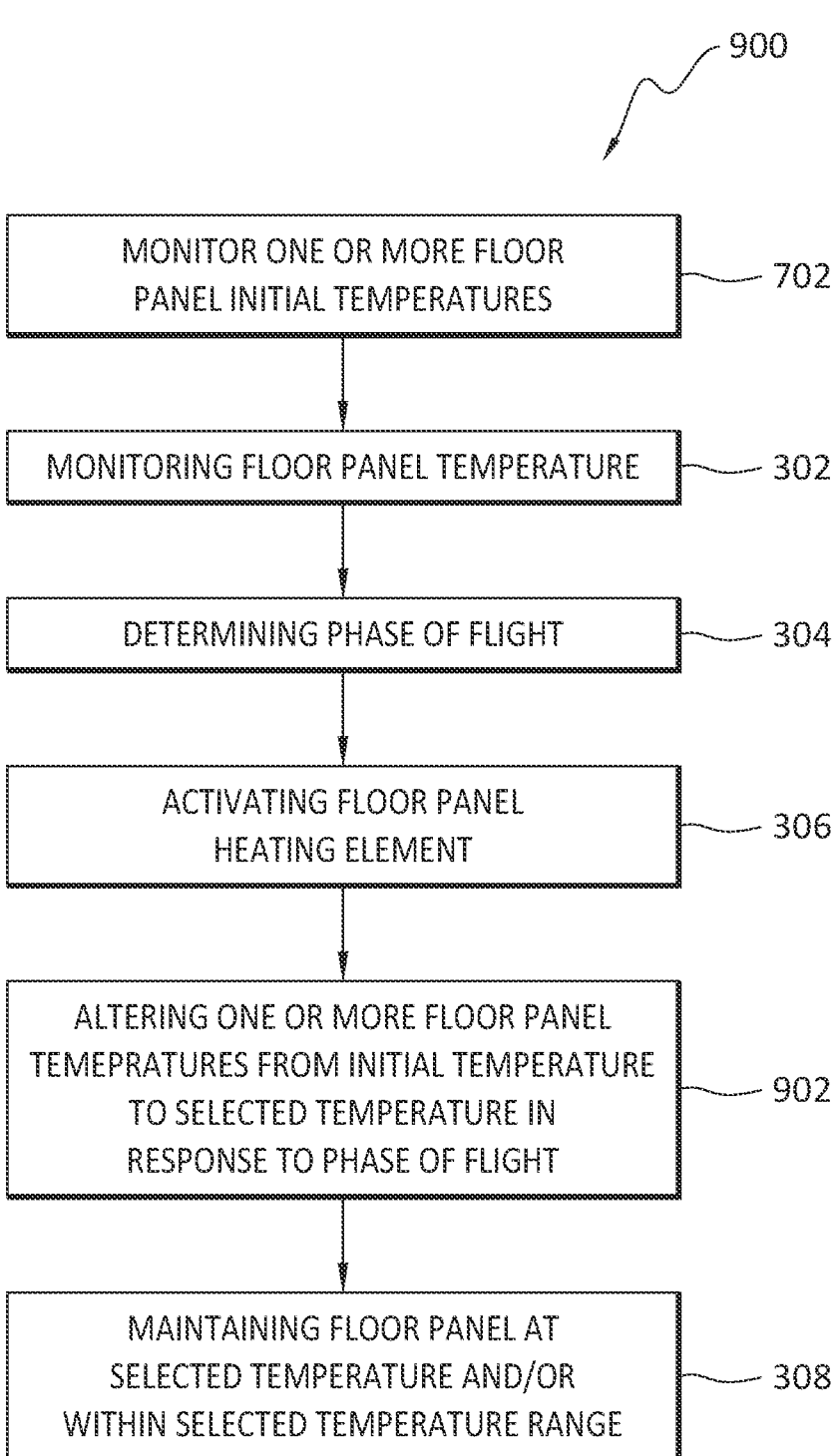
Figure 19:
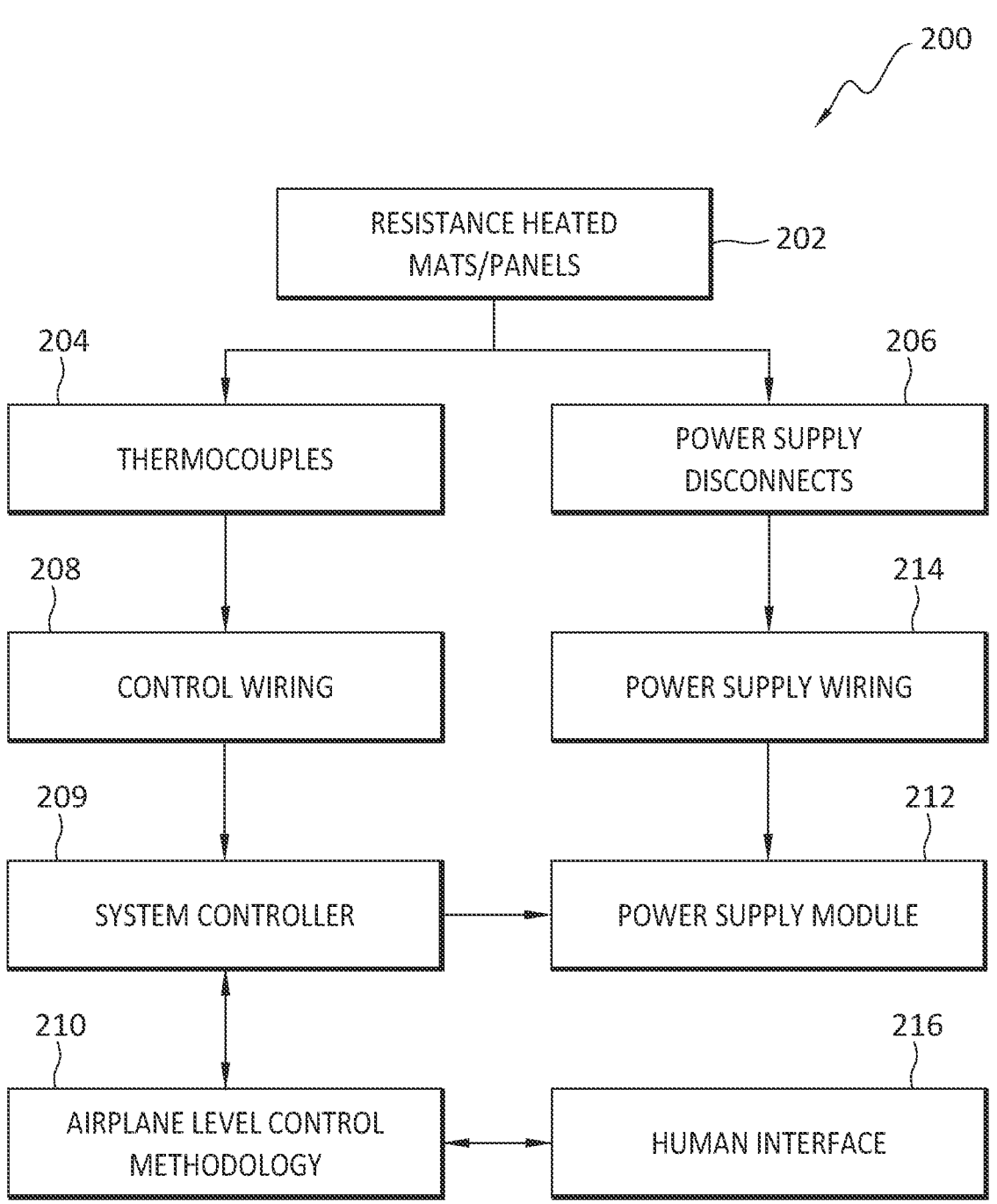
Figure 20:
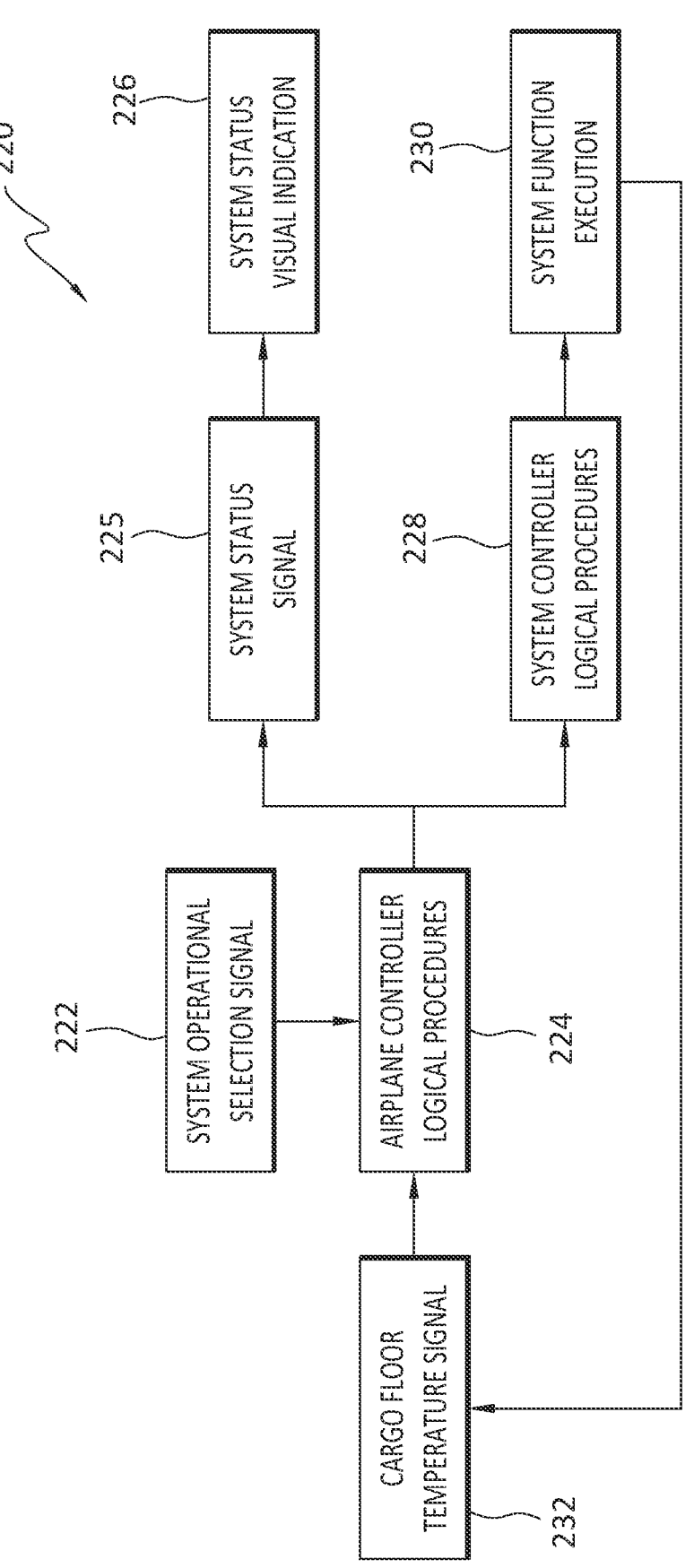

Having thus described variations of the disclosure in general terms, reference will now be made to the accompanying drawings, which are not necessarily drawn to scale, and wherein:

FIG. 1 is a perspective view of an aircraft according to present aspects;

FIG. 2A is a cross-sectional view of the aircraft of the type shown in FIG. 1, taken across line 2A-2A, and according to present aspects;

FIG. 2B is a cross-sectional view of the aircraft of the type shown in FIG. 1, taken across line 2A-2A, an according to present aspects;

FIG. 3 is an overhead plan view of an aircraft of the type shown in FIGS. 1, 2A, and 2B, according to present aspects;

FIG. 4A is a perspective partially exposed view of a cargo aircraft, according to further present aspects;

FIG. 4B is a perspective partially exposed view of a cargo aircraft of the type shown in FIG. 4A, according to further present aspects;

FIG. 5 is an enlarged partially exposed view of a cargo aircraft of the type shown in FIG. 4B, according to present aspects;

FIG. 6A is an overhead plan view of an aircraft cargo compartment floor, according to present aspects;

FIG. 6B is an overhead plan view of a cargo aircraft cargo compartment floor, according to present aspects;

FIG. 7 is a schematic view of a system incorporating an aircraft cargo compartment floor of the type shown in FIGS. 6A and 6B, according to present aspects;

FIG. 8 is a schematic diagram of a control unit, according to present aspects;

FIG. 9 is a schematic diagram of a server and analyzing subsystem, according to present aspects;

FIG. 10 is a schematic diagram of a wireless communications network, according to present aspects;

FIG. 11 is a flowchart outlining a method, according to present aspects;

FIG. 12 is a flowchart outlining a method, according to present aspects;

FIG. 13 is a flowchart outlining a method, according to present aspects;

FIG. 14 is a flowchart outlining a method, according to present aspects;

FIG. 15 is a flowchart outlining a method, according to present aspects;

FIG. 16 is a flowchart outlining a method, according to present aspects;

FIG. 17 is a flowchart outlining a method, according to present aspects;

FIG. 18 is a flowchart outlining a method, according to present aspects;

FIG. 19 is a logical block diagram according to present aspects;

FIG. 20 is a functional block diagram according to present aspects; and

Figure 21:
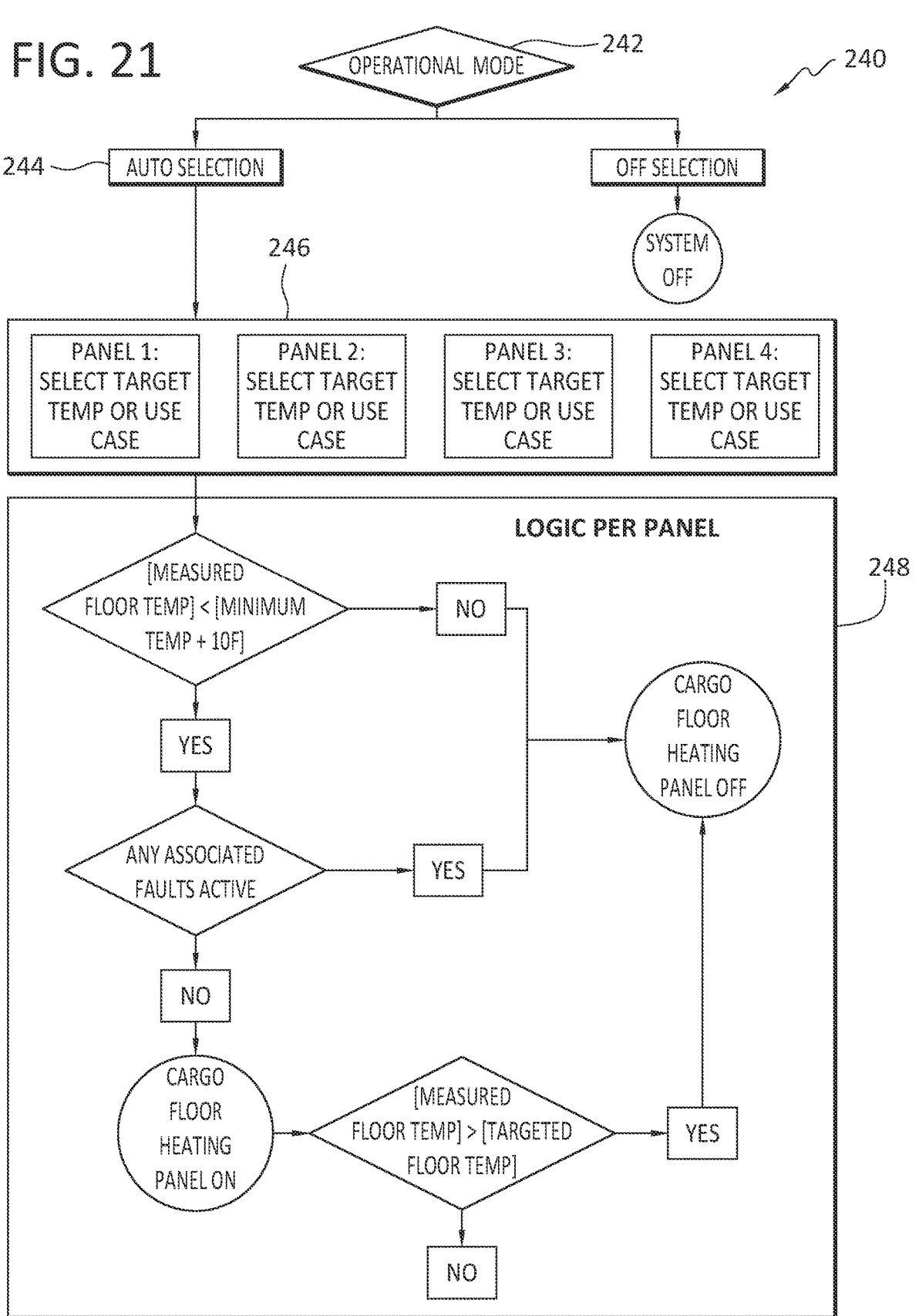

FIG. 21 is an operational functional diagram, according to present aspects.

DETAILED DESCRIPTION

In view of the varying needs for cargo transported in aircraft with cargo compartments, a significant need arises for the safe transportation of cargo with respect to maintaining such cargo at specified and selected temperatures within specified and selected temperature ranges during various phases of flight that, if left uncontrolled, could subject cargo to adverse climate conditions within the cargo compartments including, for example, temperature extremes (e.g., temperatures ranging from about 0° F. to about 32° F., etc.). Presently disclosed methods, apparatuses, and systems are disclosed that facilitate, control, select, and determine temperatures within an aircraft cargo compartment, an aircraft cargo compartment region, an aircraft cargo compartment floor, and an aircraft cargo compartment floor panel.

Present aspects address and anticipate potential temperature variations within an aircraft cargo compartment including the detection of temperature variations within an aircraft cargo compartment including, for example, multiple aircraft cargo compartment regions within a single aircraft cargo compartment and/or temperature variations among regions within multiple aircraft cargo compartments, aircraft cargo flooring within a single cargo compartment or multiple cargo compartments, and cargo compartment floor panels of single or multiple cargo compartments. Further aspects include the monitoring of aircraft cargo compartment floor panels during flight, including during a variety of phases of flight, and the activation of systems and apparatuses designed to alter the temperature of aircraft cargo compartment floor panels, in real time, and in response to determined phases of flight, including the temperature variations during various phases of flight that can otherwise typically and adversely impact cargo transported by an aircraft.

According to present aspects, the disclosed apparatuses, systems, and methods allow for temperatures of an aircraft cargo compartment cargo floor to be heated to selected temperature that are divergent from an initial temperature to a selected temperature and/or maintained at an initial selected temperature as the aircraft cargo environments sustain an ambient temperature decrease, for example, during flight, etc. In addition, present apparatuses, systems and methods disclose the ability to control a plurality of aircraft cargo compartment floor panels to be individually controlled such that the temperatures of the plurality of individual floor panels and floor panel regions within an aircraft cargo bay can be regulated, controlled, altered and/or maintained at a selected temperature in response to the needs of the proximately located cargo within the cargo bay of an aircraft, and further regulated, controlled, altered and/or maintained at a selected temperature in response to a detected and/or determined phase of flight of an aircraft for the benefit of aligning a cargo at a selected temperature within a selected temperature range during the entirety of an aircraft's flight.

Presently disclosed systems and methods afford additional structural benefits to an aircraft that can include, for example, the ability to remove bilge insulation that is no longer necessary in an aircraft structure for heat retention, etc. The removal of bilge insulation from an aircraft cargo environment allows aircraft manufacturers to more effectively meet various regulations directed to various fire regulations, etc. Through the elimination and/or reduction in bilge insulation, present apparatuses, systems, and methods can significantly reduce aircraft weight, operational cost, and increase aircraft manufacturing and aircraft operational efficiency by significantly reducing and or eliminating at least one of a number of installation, inspection, material qualification steps, etc., and otherwise eliminate or significantly reduce scheduled rework, refitting, etc., of bilge insulation, etc.

According to present aspects, FIG. 1 is a perspective view of an aircraft 10 having a fuselage 12, with aircraft 10 comprising the presently disclosed apparatuses, systems, and methods. FIGS. 2A and 2B are cross-sectional views of the aircraft 10 of the type represented in FIG. 1, with the views shown in FIGS. 2A and 2B taken across lines 2A-2A and 2B-2B, respectively.

As shown in FIG. 2A, aircraft 10 comprises aircraft fuselage 12, with aircraft fuselage 12 shown having an aircraft fuselage exterior 12*a* and an aircraft fuselage interior 12*b* generally defining an aircraft passenger cabin 13 and an aircraft cargo compartment 14 (shown in FIG. 2A as being a forward aircraft cargo compartment, referred to equivalently herein as a "first" aircraft cargo compartment 16. First aircraft cargo compartment 16 is further shown in FIG. 2A as being defined by, or otherwise bounded by, the aircraft passenger cabin floor 13*a* and the aircraft cargo compartment floor 14*a*.

As further shown in FIG. 2A, first aircraft cargo compartment floor panels 16*a*, 16*b*, and 16*c* are shown in a recessed configuration with the "top" surface of the first aircraft cargo compartment floor panels shown as being substantially flush or otherwise substantially even with the surrounding aircraft cargo compartment floor 14*a*. First aircraft cargo compartment regions 15*a*, 15*b*, 15*c* (e.g., the "regions" shown as vertically adjacent to the first aircraft cargo compartment floor panels 16*a*, 16*b*, and 16*c*, respectively) are shown as dotted lines extending vertically from first aircraft cargo compartment floor panels 16*a*, 16*b*, and 16*c* respectively, with the lower end of the aircraft cargo compartment "regions" 15*a*, 15*b*, 15*c* shown to be adjacent to, and otherwise in communication with, the first aircraft cargo compartment floor panels 16*a*, 16*b*, and 16*c*, respectively.

As shown in FIG. 2B, aircraft 10 comprises aircraft fuselage 12, with aircraft fuselage 12 shown having an aircraft fuselage exterior 12*a* and an aircraft fuselage interior 12*b* generally defining an aircraft passenger cabin 13 and an aircraft cargo compartment 14 (shown in FIG. 2B as being the "aft" aircraft cargo compartment, referred to equivalently herein as the "second" aircraft cargo compartment 18). Second aircraft cargo compartment 18 is further shown in FIG. 2B as being defined by or otherwise bounded by the aircraft passenger cabin floor 13*a* and the aircraft cargo compartment floor 14*a*. As further shown in FIG. 2B, first aircraft cargo compartment floor panels 18*a*, 18*b*, and 18*c* are shown in a recessed configuration with the "top" surface of the first aircraft cargo compartment floor panels shown as being substantially flush or otherwise substantially even with the surrounding aircraft cargo compartment floor 14*a*. Second aircraft cargo compartment regions 21*a*, 21*b*, 21*c* (e.g., the "regions" shown as bounded by dotted lines) are shown extending vertically from second aircraft cargo compartment floor panels 18*a*, 18*b*, and 18*c* respectively, with the lower end of the aircraft cargo compartment "regions" 21*a*, 21*b*, 21*c* shown to be adjacent to, and otherwise in communication with, the first aircraft cargo compartment floor panels 18*a*, 18*b*, and 18*c*, respectively.

FIG. 3 is an overhead, and partially exposed, plan view of aircraft 10 of the type shown in FIGS. 1, 2A, and 2B. FIG. 3 shows the "forward" cargo bay referred to equivalently herein as the first aircraft cargo compartment 16 and the "aft" cargo bay referred to equivalently herein as the second aircraft cargo compartment 18. As shown in FIG. 3, the first aircraft cargo compartment 16 includes a plurality of first aircraft cargo compartment floor panels 16*a*, 16*b*, 16*c*. While three (3) first aircraft cargo compartment floor panels are shown, present aspects contemplate any selected number of first aircraft cargo compartment floor panels installed within, adjacent to, or otherwise in communication with the first aircraft cargo compartment floor.

In addition, present aspects further contemplate a selected percentage of available floor area (e.g., ft²) in an aircraft cargo compartment comprising the presently disclosed aircraft cargo compartment floor panels with heating elements, including from about 25% to 95% of available aircraft cargo compartment floor area and, more preferably from about 50% to about 85% of available aircraft cargo compartment floor area. According to further aspects, power from a power supply can be provided to satisfy the intended purposes and temperatures to be maintained, with an estimated power provided equal to an amount ranging from about 3 kW to about 8 kW per cargo compartment.

FIG. 3 further shows the second aircraft cargo compartment 18 including a plurality of second aircraft cargo compartment floor panels 18*a*, 18*b*, 18*c*. While three (3) second aircraft cargo compartment floor panels are shown, present aspects contemplate any selected number of second aircraft cargo floor panels installed within, adjacent to, or otherwise in communication with the second aircraft cargo compartment floor. Further features of the first and second aircraft cargo floor panels are shown and described herein at least with respect FIG. 6A.

Present apparatuses, systems, and methods contemplate the regulation of thermal conditions within the cargo compartments of aircraft types, including passenger aircraft and cargo aircraft (referred to equivalently herein as "freight" aircraft). FIGS. 4A and 4B illustrate cargo aircraft comprising present apparatuses, systems, and methods.

FIG. 4A is a perspective, partially exposed view of cargo aircraft 110 comprising fuselage 112 having cargo aircraft fuselage exterior 112*a* and cargo aircraft fuselage interior 112*b*. As shown in FIG. 4A, the cargo aircraft fuselage interior can define (along with cargo aircraft cargo compartment floor 114*a*) the cargo aircraft cargo compartment 114. FIG. 4A further shows a plurality of cargo aircraft cargo compartment floor panels. While eighteen (18) cargo aircraft cargo compartment floor panels are shown in FIG. 4A, present aspects contemplate any selected number of cargo aircraft cargo compartment floor panels installed within, adjacent to, or otherwise in communication with the cargo aircraft cargo compartment floor 114*a*.

According to a present aspect, a partition can be installed within the cargo compartment of an aircraft cargo compartment. The inclusion of a partition can assist present systems and methods in establishing and maintaining varying temperatures in and throughout zones and regions within an aircraft cargo compartment.

FIG. 4B is a perspective, partially exposed view of cargo aircraft 110 of the type shown in FIG. 4A, with the cargo aircraft cargo compartment 114 now containing a plurality of cargo containers 118 in position within the cargo aircraft cargo compartment 114, and with selected cargo containers 118 positioned in a selected orientation within the cargo aircraft cargo compartment 114 and further oriented into selected positions over, adjacent to, or otherwise in communication with one or more selected cargo aircraft cargo compartment floor panels 116.

FIG. 5 is an enlarged, partial perspective, and exposed view of a cargo aircraft 110 of the type shown in FIG. 4B. FIG. 5 perhaps more clearly shows the cargo aircraft cargo compartment 114 containing a plurality of cargo containers 118 in position within the cargo aircraft cargo compartment 114, and with selected cargo containers 118 positioned in a selected orientation within the cargo aircraft cargo compartment 114 and further oriented into selected positions over, adjacent to, or otherwise in communication with one or more selected cargo aircraft cargo compartment floor panels 116. As further shown in FIG. 5, a plurality of cargo containers 118 are enumerated as 118*a*, 118*b*, 118*c*, 118*d*, 118*e*, 118*f*, with each of the enumerated containers oriented at selected positions within aircraft cargo compartment 114 and with each of plurality of cargo containers 118 enumerated as 118*a*, 118*b*, 118*c*, 118*d*, 118*e*, 118*f* having a correspondingly enumerated cargo aircraft cargo compartment floor panel 116*a*, 116*b*, 116*c*, 116*d*, 116*e*, 116*f* located in a selected position under, over, adjacent to, or otherwise in communication with a selected section of the cargo aircraft cargo compartment floor 114*a*. Further features of the cargo aircraft cargo compartment floor panels are shown and described herein with respect to at least FIG. 6B.

FIGS. 6A and 6B are enlarged representative overhead plan views, not necessarily drawn to scale, of the presently disclosed aircraft cargo compartment floor panels representing their relative selected positioning within an aircraft, according to present aspects, and better show additional features, including the heating elements associated with and otherwise incorporated into the (passenger and cargo) aircraft cargo compartment floor panels. For example, FIG. 6A shows an enlarged representative view of aircraft 10 of the type shown at least in FIGS. 1, 2A, 2B, and 3. FIG. 6A shows the first aircraft cargo compartment 16 (the "forward" cargo compartment) and the second aircraft cargo compartment 18 (the "aft" compartment). The ("forward") first aircraft cargo compartment 16 is shown comprising a plurality of first aircraft cargo compartment floor panels 16a, 16b, 16c, with each of the first aircraft cargo compartment floor panels 16a, 16b, 16c each further comprising a corresponding first aircraft cargo compartment floor panel heating element 17a, 17b, 17c. FIG. 6A further shows the ("aft") second aircraft cargo compartment 18 comprising a plurality of second aircraft cargo compartment floor panels 18a, 18b, 18c, with each of the second aircraft cargo compartment floor panels 18a, 18b, 18c each further comprising a corresponding second aircraft cargo compartment floor panel heating element 19a, 19b, 19c. While each cargo compartment in FIG. 6A shows three floor panels, each cargo compartment can comprise at least one floor panel and can further comprise any selected number of floor panels in excess of the three floor panels shown, and that can be practical to meet the presently stated objectives. Although not shown in FIG. 6A, each floor panel comprises requisite connections to, and is otherwise in communication with, a power source, as shown and described herein.

FIG. 6B is an enlarged representative overhead plan view of aircraft 110 (a "cargo" aircraft) of the type shown at least in FIGS. 4A, 4B, and 5. FIG. 6B shows aircraft cargo compartment 114 comprising a plurality of cargo aircraft cargo compartment floor panels 116a, 116b, 116c, 116d (e.g., positioned within a cargo aircraft cargo compartment floor 114a) with each of the aircraft cargo compartment floor panels 116a, 116b, 116c, 116d each further comprising a corresponding cargo aircraft cargo compartment floor panel heating element 117a, 117b, 117c. While the cargo aircraft cargo compartment 114 in FIG. 6B shows four (4) floor panels, each cargo compartment can comprise at least one floor panel and can further comprise any selected number of floor panels in excess of the four floor panels shown, and that can be practical to meet the presently stated objectives. In other words, FIG. 6B is understood as showing a partial view (and does not show the entirety) of a cargo aircraft cargo compartment, according to present aspects.

FIG. 6B further shows each of the plurality of cargo aircraft cargo compartment floor panels 116a, 116b, 116c, 116d in communication with a power source 20. Although FIG. 6B shows one power source 20 in communication with each of the cargo aircraft cargo compartment floor panels 116a, 116b, 116c, 116d, present aspects further contemplate each cargo aircraft cargo compartment floor panel 116a, 116b, 116c, 116d in communication with a separate power source (not shown).

FIG. 7 is a schematic diagram outlining further aspects of cargo aircraft 110 of the type described, for example, at least in FIG. 6B. According to present aspects, (and although not shown), the elements shown in communication with the floor panels as presented in FIG. 7 are understood as also applying to the elements to be found in the floor panels of aircraft as shown in FIG. 6A. That is, while FIGS. 6B and 7 show floor panels within a cargo aircraft generally having one large cargo compartment, or a large cargo compartment that can be separated by one or more partitions, present aspects further contemplate the floor panels features described herein, and shown in FIG. 7 as further representing the type of floor panels that can also be incorporated into the aircraft cargo compartments (e.g., the "forward" or first aircraft cargo compartment, and the "aft" or second aircraft cargo compartment) of the type typically found in passenger aircraft.

FIG. 7 shows an enlarged representative view of system 100 in aircraft 110 (a "cargo" aircraft) of the type shown at least in FIGS. 4A, 4B, 5 and 6B. FIG. 7 shows the aircraft cargo compartment 114 comprising cargo aircraft cargo compartment floor 116 further comprising a plurality of cargo aircraft cargo compartment floor panels 116a, 116b, 116c, 116d with each of the aircraft cargo compartment floor panels 116a, 116b, 116c, 116d each further comprising corresponding cargo aircraft cargo compartment floor panel heating elements 117a, 117b, 117c, 117d that can be positioned at a floor panel surface, or that can be located within the floor panels at a sub-surface location (e.g., with the heating elements positioned within the thickness of the floor panels, and located within the floor panel at a selected distance from, for example, an exposed floor panel surface.

The cargo aircraft cargo compartment floor panels 116a, 116b, 116c, 116d, as shown in FIG. 7 are each in communication, with power supply 120. Discrete power supply disconnects 126a, 126b, 126c, 126d are shown in communication with the corresponding floor panels 116a, 116b, 116c, 116d, and with the discrete power supply disconnects 126a, 126b, 126c, 126d further in communication with power supply 120.

FIG. 7 further shows thermal sensors in the form of thermocouples 124a, 124b, 124c, 124d contacting the corresponding and respective cargo aircraft cargo compartment floor panels 116a, 116b, 116c, 116d. More particularly, as shown in FIG. 7, thermocouples 124a are configured to contact cargo aircraft cargo compartment floor panel 116a; thermocouples 124b are configured to contact cargo aircraft cargo compartment floor panel 116b; thermocouples 124c are configured to contact cargo aircraft cargo compartment floor panel 116c; and thermocouples 124d are configured to contact cargo aircraft cargo compartment floor panel 116d.

Controller 122, shown in FIG. 7, is configured to be in communication with the thermocouples 124a, 124b, 124c, 124d that are also in communication with the cargo aircraft cargo compartment floor panels 116a, 116b, 116c, 116d. Controller 122 is further in communication with the discrete power supply disconnects 126a, 126b, 126c, 126d, placing power supply 120, at least indirectly, in communication with controller 122.

In operation, according to a present aspect, a phase of flight of the aircraft can be manually determined and input into system 100, or automatically determined by phase of flight sensor 28. The phase of flight sensor 28 can be in communication with, or otherwise be configured to receive a signal from, for example, an instrument such as, for example, an altimeter, a pressure sensing device, a flight record timing device (e.g., a timer/clock), a computer program, etc. According to another aspect, the phase of flight sensor can interpret information from an instrument, or the phase of flight sensor can be an instrument itself. According to another aspect, the phase of flight sensor can be in communication with a control circuit that can process detected flight characteristics that can be manually interpreted, or that can be automatically generated from, for example, a computer program, and that can signal controller 122 for the purpose of activating system 100 shown in FIG. 7.

According to a present aspect, during pre-flight, an aircraft, and an aircraft cargo compartment can be exposed to an ambient temperature on the ground. However, a particular cargo may require a temperature other than the ambient ground temperature. In addition, as an aircraft increases altitude after takeoff, the ambient temperature outside of the aircraft will decrease, for example, as altitude increases. Passenger compartments are typically pressurized and heated to a pressure and temperature that is comfortable for passengers, while cargo compartments may only be heated to, pressurized to, or be otherwise maintained within a temperature range that insures that pressurized contents or liquid contents within the cargo compartments are not adversely impacted due to pressure and/or temperature changes.

According to present aspects, as phase of flight changes, present systems can detect temperature changes, and present systems can further be activated, including in real time, based on perceived or otherwise determined phases of flight of the aircraft, where the phase of flight can be preprogrammed as correlating to expected temperatures or expected temperature changes within the cargo compartment during a particular phase of flight (that can, for example, be based on altitude, time measured as elapsed time of a flight, etc.) and that will be sustained during and at a particular phase of flight, etc.

According to a further aspect, a particular cargo (e.g., a particular cargo type such as, for example, plants, flowers, livestock, perishable items, etc.) within a cargo compartment can require that a particular temperature be maintained during a flight duration and through a variety of phases of flight. According to present aspects, a selected placement of a particular cargo within an aircraft cargo compartment can comprise locating a particular cargo type proximate to or otherwise in contact with selected aircraft cargo compartment floor panels that can be individually activated according to present systems and methods to provide energy in the form of heat at the location of activated cargo compartment floor panels, with a selected amount of heat emanating from the activated cargo compartment floor panels to maintain a cargo region (and the cargo contained within a particular cargo region, etc.) at a temperature within a selected temperature range that best suits a proximately located cargo type.

According to present aspects, a thermal sensor that can be in the form of a thermostat is in communication with individual floor panels such that the system at least: 1) monitors a cargo compartment floor panel temperature that can be an initial/pre-flight cargo compartment floor panel temperature; 2) can relay information regarding the temperature of individual floor panels; 3) can send signals to the system controller relaying information regarding temperatures and temperature changes; 4) based on the detected temperature, can increase or decrease current sent to the heating element of individual panels (e.g., for the purpose of increasing or decreasing the temperature of the panel); and 5) can monitor and control cargo region temperatures, and individual cargo compartment floor panel temperatures in response to a detected or an inputted phase of flight, etc.

With respect to FIG. 7, according to a present aspect, at an initial phase of flight that can be, for example, pre-flight (e.g., pre-takeoff) aircraft floor panels 116a, 116b, 116c, 116d can have an initial temperature that can be sensed by respective thermostats 124a, 124b, 124c, 124d, and that can send information in the form of signals to controller 122. As the phase of flight sensor 28 perceives a change of phase of flight, or as the controller 122 otherwise receives information regarding a change in phase of flight, in real time, the phase of flight sensor 28 sends a signal to controller 122. In response to the information received from the phase of flight sensor 28, controller 122 is configured to send signals to power source 120 and/or to respective heating elements 117a, 117b, 117c, 117d such that the heating elements are activated or deactivated for the purpose of increasing or decreasing temperatures of the respective cargo aircraft cargo compartment floor panels 116a, 116b, 116c, 116d to a maintain or achieve floor panel temperatures within a selected temperature range. According to present aspects, "real time" connotes a short period of time on the order of "seconds", and within a period of time ranging, for example, from about 0.1 second to about 1 second.

Presently disclosed apparatuses, systems, and methods further comprise aircraft, aircraft cargo compartments, and aircraft cargo compartment floors and aircraft cargo compartment floor panels configured to be in communication with an analyzing system that can detect or otherwise determine an aircraft's phase of flight, receive signals from detectors (e.g., receiving signals from detectors via one or more controller, etc.), send signals to one or more controller(s) in communication with floor panel heating elements to, for example, change and/or maintain floor panel temperatures in response to a detected and/or a determined phase of flight, and receive and send signals to/from one or more controllers from one or more power sources to change or maintain individual aircraft cargo compartment floor panels (e.g., from a plurality of floor panels within a system of floor panels) at one or more differing temperatures, at selected temperatures within a selected temperature range, etc.

For example, present apparatuses, systems, and methods, can include and otherwise be in communication with a control unit 50, as illustrated in FIG. 8, that can be located within or apart from an aircraft (e.g., a system located within the aircraft and/or a system located, at least in part as part of a ground-based control maintained in communication with an aircraft in flight, etc.). According to a present aspect, the control unit 50 includes a control circuit 51 and a memory circuit 52. Control circuit 51 can control overall operation of the system 100 shown in FIG. 7, including according to program instructions stored in memory circuit 52. Control circuit 51 can include one or more circuits, microcontrollers, microprocessors, hardware, or a combination thereof. Memory circuit 52 can include a non-transitory computer readable storage medium storing program instructions, such as a computer program product, that configures the control circuit 51 to implement one or more of the techniques discussed herein. Memory circuit 52 can include various memory devices such as, for example, read-only memory, and flash memory. Memory circuit 52 can be a separate component as illustrated in FIG. 8, or can be incorporated with the control circuit 51. Alternatively, the control circuit 51 can omit the memory circuit 52, e.g., according to at least some present aspects in which the control circuit 51 is dedicated and non-programmable.

Control unit 50 can be configured to provide for communication functionality with the aircraft cargo compartment floor panels. Communications can include both incoming and outgoing communications. A communications circuit 53 provides for this communication functionality. The communications circuit 53 can enable communication between the aircraft cargo compartment floor panels and, for example, remote entities over a communication network, etc.

The communications circuit 53 can include one or more interfaces that provide for different methods of communication. The communications circuit 53 can include a cellular interface that enables communication with a mobile communication network (e.g., a WCDMA, LTE, or WiMAX network). The communication circuit 53 can include a WLAN interface configured to communicate with a local area network, e.g., via a wireless access point. An exemplary WLAN interface could operate according to the 802.11 family of standards, which is commonly known as a WiFi interface. The communication circuit 53 can further include a personal area network interface, such as a Bluetooth interface. The communication circuit 53 can also include a Near Field Communication interface that provides for short-range wireless connectivity technology that uses magnetic field induction to permit devices to share information with each other over short distances.

In one example, and as illustrated in FIG. 8, the communications circuit 53 is incorporated into the control unit 50 that can comprise controller 122. In another example, the communications circuit 53 is a separate system that is operatively connected to and controlled by a separate control unit 50. A power source 54 provides power to the control unit 50. The power source 54 can include various configurations, including but not limited to batteries. The power source 54 can include a connector 56 to provide a hardwire connection to an external power source (e.g., electrical power from the aircraft 10, etc.). FIG. 8 includes the power source 54 incorporated with the control unit 50. In another example, the power source 54 can be separate from the control unit 50 and configured to provide power to the control unit 50.

As illustrated in FIGS. 9, an analyzing subsystem 65 can comprise a server 60, that can be a remote server, and that can monitor the phase of flight and the temperature of individual aircraft cargo compartment floor panels, for example, at rest, and during operation of the aircraft. The remote server 60 can monitor and communicate with the individual aircraft cargo compartment floor panels, for example, through a wireless communications network 70 (as shown in FIG. 9). The communications circuit 53 (shown in FIG. 8) of the system 100 enables communication with the server 60 through the wireless communications network 70.

As shown in FIG. 10, the wireless communication network 70 can includes s packet data network (PDN) 71. The PDN 71 can include a public network such as the Internet, or a private network. The wireless communications network 70 can include a mobile communication network 72 (e.g., a WCDMA, LTE, or WiMAX network). The mobile communication network (MCN) 72 includes a core network 73 and a radio access network (RAN) 74 including one or more base stations. The MCN 72 can be a conventional cellular network operating according to any communication standards now known or later developed. For example, the MCN 72 can comprise a Wideband Code Division Multiple Access (WCDMA) network, a Long Term Evolution (LTE) network, or WiMAX network. The MCN 72 is further configured to access the packet data network (PDN) 71.

The communications circuit 53 can also communicate through a Wireless Local Area Network (WLAN) 75 that operates according to the 802.11 family of standards, which is commonly known as a WiFi interface. Communications can also be available through one or more satellites 76. The satellites 76 can communicate to the server 60 through one or more of ground stations 77. The ground stations 77 can communicate to the server 60 through the PDN 71, or without use of the PDN 71.

As illustrated in FIG. 9, an analyzing subsystem 65 can include server 60 that can include one or more processing circuits (illustrated as processing circuit 61 that may include one or more microprocessors, microcontrollers, Application Specific Integrated Circuits (ASICs), or the like, configured with appropriate software and/or firmware. A computer readable storage medium (shown as memory circuit 62) stores data and computer readable program code that configures the processing circuit 61 to implement the techniques described above. Memory circuit 62 is a non-transitory computer readable medium, and may include various memory devices such as random access memory, read-only memory, and flash memory. A communications circuit 63 connects the server 60 to the PDN 71, and can be configured to communicate with the PDN 71 according to one or more 802.11 standards. The communications circuit 63 can support a wired connection (e.g., Ethernet), a wireless connection, or both. A database 64 stores information about, for example, phase of flight, specifics about particular aircraft types, aircraft flight itineraries, flight paths, locations of cargo types, temperature requirements of cargo types, etc. The database 64 can be stored in a non-transitory computer readable storage medium (e.g., an electronic, magnetic, optical, electromagnetic, or semiconductor system-based storage device). The database 64 can be local or remote relative to the server 60. Taken together, the elements shown in FIG. 9 can comprise an analyzing subsystem 65 configured to control thermal environments required by various selected cargo types, etc. with information relayed to the elements of the analyzing subsystem for analysis and reporting.

The analyzing subsystem 65 can be configured to provide a web interface for access by one or more entities. The server 60 is configured for accessing information about the individual aircraft cargo compartment floor panels using a browser-based interface or an applications program interface (API). The browser-based interface can include a website through which the contents of the database 64 can be accessible. Although the website can be hosted by the server 60, it can also be hosted at another location accessible through the PDN 71.

Entities can access the information at the server 60 through a variety of devices 78. The devices 78 can include laptop computers, personal computers, personal digital assistants, mobile computing/communication, tablet devices, and various other-like computing devices. Each of the entities uses a respective device 78 and accesses the server 60 through the PDN 71, or alternatively some other network. In one aspect, one or more of the entities can use his or her respective device 78 to access the server 60 through a separate portal. Each entity's portal can include a secure interface through which the entity can access the information that is assigned to them. A variety of different entities through their devices 78 can have access to some or all of the information at the server 60. The entities can include inspectors in the form of human inspectors, and machine driven artificial intelligence.

The server 60 can also access one or more information sources through the PDN 71. In one example, the server 60 is configured for browser-based accessibility. The browser-based interface can support well-known browsers such as Internet Explorer and Mozilla Firefox, Safari, Chrome. Alternatively, or in conjunction the entities can obtain the information using one or more APIs through their device 78. Prior to cargo loading and takeoff, the present apparatuses, systems, and according to present methods, information about the cargo, the cargo location within a cargo compartment can be entered and maintained at the database stored at the server 60 of an analyzing subsystem 65.

FIGS. 11-18 are flowcharts outlining methods according to present aspects. According to present aspects, FIG. 11 outlines a method 300 is disclosed for controlling an aircraft cargo compartment climate, with the method including monitoring 302 a first aircraft cargo compartment floor initial temperature of the first aircraft cargo compartment floor configured within an aircraft cargo bay of an aircraft, with the first aircraft cargo compartment floor including at least one first aircraft cargo compartment floor panel, with the first aircraft cargo compartment floor panel including a first aircraft cargo compartment floor panel initial temperature, and with the first aircraft cargo compartment floor panel further including a first aircraft cargo compartment floor panel heating element. The method further including determining 304 a phase of flight of the aircraft to obtain a determined phase of flight, activating 306 the first aircraft cargo compartment floor panel heating element in response to the determined phase of flight, with the first aircraft cargo compartment floor panel heating element in communication with the at least one first aircraft cargo compartment floor panel, and maintaining 308 the first aircraft cargo compartment floor panel at a first aircraft cargo compartment floor panel selected temperature that is within a first aircraft cargo compartment floor selected temperature range The method outlined in FIG. 11 can employ the apparatuses and systems set forth herein and described at least in FIGS. 1, 2A, 2B, 3, 4A-4B, 5, 6A, 6B, and 7-10.

According to further present aspects, FIG. 12 outlines a method 400 for controlling an aircraft cargo compartment climate, including with the method including monitoring 302 a first aircraft cargo compartment floor initial temperature of the first aircraft cargo compartment floor configured within an aircraft cargo bay of an aircraft, with the first aircraft cargo compartment floor including at least one first aircraft cargo compartment floor panel, with the first aircraft cargo compartment floor panel including a first aircraft cargo compartment floor panel initial temperature, and with the first aircraft cargo compartment floor panel further including a first aircraft cargo compartment floor panel heating element. The method further including determining 304 a phase of flight of the aircraft to obtain a determined phase of flight, activating 306 the first aircraft cargo compartment floor panel heating element in response to the determined phase of flight, with the first aircraft cargo compartment floor panel heating element in communication with the at least one first aircraft cargo compartment floor panel, altering 402 a first aircraft cargo compartment floor detected temperature to a temperature within the first aircraft cargo compartment floor selected temperature range, and maintaining 308 the first aircraft cargo compartment floor panel at a first aircraft cargo compartment floor panel selected temperature that is within a first aircraft cargo compartment floor selected temperature range. The method outlined in FIG. 12 can employ the apparatuses and systems set forth herein and described at least in FIGS. 1, 2A, 2B, 3, 4A-4B, 5, 6A, 6B, and 7-10.

According to further present aspects, FIG. 13 outlines a method 500 for controlling an aircraft cargo compartment climate, including with the method including monitoring 302 a first aircraft cargo compartment floor initial temperature of the first aircraft cargo compartment floor configured within an aircraft cargo bay of an aircraft, with the first aircraft cargo compartment floor including at least one first aircraft cargo compartment floor panel, with the first aircraft cargo compartment floor panel including a first aircraft cargo compartment floor panel initial temperature, and with the first aircraft cargo compartment floor panel further including a first aircraft cargo compartment floor panel heating element. The method further including determining 304 a phase of flight of the aircraft to obtain a determined phase of flight, activating 306 the first aircraft cargo compartment floor panel heating element in response to the determined phase of flight, with the first aircraft cargo compartment floor panel heating element in communication with the at least one first aircraft cargo compartment floor panel, altering 502 a first aircraft cargo compartment floor detected temperature to a temperature within the first aircraft cargo compartment floor selected temperature range in response to the determined phase of flight, and maintaining 308 the first aircraft cargo compartment floor panel at a first aircraft cargo compartment floor panel selected temperature that is within a first aircraft cargo compartment floor selected temperature range. According to present aspects, "altering" a temperature includes the operation(s) of increasing or decreasing a temperature. The method outlined in FIG. 13 can employ the apparatuses and systems set forth herein and described at least in FIGS. 1, 2A, 2B, 3, 4A-4B, 5, 6A, 6B, and 7-10.

According to further present aspects, FIG. 14 outlines a method 600 for controlling an aircraft cargo compartment climate, including with the method including monitoring 302 a first aircraft cargo compartment floor initial temperature of the first aircraft cargo compartment floor configured within an aircraft cargo bay of an aircraft, with the first aircraft cargo compartment floor including at least one first aircraft cargo compartment floor panel, with the first aircraft cargo compartment floor panel including a first aircraft cargo compartment floor panel initial temperature, and with the first aircraft cargo compartment floor panel further including a first aircraft cargo compartment floor panel heating element. The method further including determining 304 a phase of flight of the aircraft to obtain a determined phase of flight, detecting 602 a change in the first aircraft cargo compartment floor initial temperature during the detected and determined phase of flight, activating 306 the first aircraft cargo compartment floor panel heating element in response to the determined phase of flight, with the first aircraft cargo compartment floor panel heating element in communication with the at least one first aircraft cargo compartment floor panel, and maintaining 604 the first aircraft cargo compartment floor panel selected temperature to maintain the first aircraft cargo compartment selected temperature within the first aircraft cargo compartment selected temperature range in response to the determined phase of flight. The method outlined in FIG. 14 can employ the apparatuses and systems set forth herein and described at least in FIGS. 1, 2A, 2B, 3, 4A-4B, 5, 6A, 6B, and 7-10.

According to further present aspects, FIG. 15 outlines a method 700 for controlling an aircraft cargo compartment climate that includes the steps of method 300 outlined in FIG. 11, and additionally including monitoring 702 a second aircraft cargo compartment floor initial temperature in a second aircraft cargo compartment configured within an aircraft cargo bay, with the second aircraft cargo compartment floor including at least one second aircraft cargo compartment floor panel, with the second aircraft cargo compartment floor panel including a second aircraft cargo compartment floor panel initial temperature, and with the second aircraft cargo compartment floor panel further including a second aircraft cargo compartment floor panel heating element. The method further includes activating the second aircraft cargo compartment floor panel heating element, with the second aircraft cargo compartment floor panel heating element in communication with the second aircraft cargo compartment floor panel, and altering the second aircraft cargo compartment floor panel initial temperature to a second aircraft cargo compartment floor panel selected temperature. The methods outlined in FIG. 15 can employ the apparatuses and systems set forth herein and described at least in FIGS. 1, 2A, 2B, 3, 4A-4B, 5, 6A, 6B, and 7-10.

According to further present aspects, FIG. 16 outlines a method 800 for controlling an aircraft cargo compartment climate that includes the steps of method 700 outlined in FIG. 15, with method 800 further including maintaining 802 the second aircraft cargo compartment floor selected temperature of the second aircraft cargo compartment within a second aircraft cargo compartment floor selected temperature range. The methods outlined in FIG. 16 can employ the apparatuses and systems set forth herein and described at least in FIGS. 1, 2A, 2B, 3, 4A-4B, 5, 6A, 6B, and 7-10.

According to further present aspects, FIG. 17 outlines a method 900 for controlling an aircraft cargo compartment climate that includes the steps of method 700 outlined in FIG. 15, with method 900 further including altering 902 the second aircraft cargo compartment floor panel initial temperature to a second aircraft cargo compartment floor panel selected temperature in response to the determined phase of flight. The methods outlined in FIG. 17 can employ the apparatuses and systems set forth herein and described at least in FIGS. 1, 2A, 2B, 3, 4A-4B, 5, 6A, 6B, and 7-10.

According to further present aspects, FIG. 18 outlines a method 1000 for controlling an aircraft cargo compartment climate that includes the steps of method 700 outlined in FIG. 17, with method 1000 further including detecting 1002 a change in the second aircraft cargo compartment floor initial temperature during the determined phase of flight, and altering a detected second aircraft cargo compartment floor panel temperature to restore the second aircraft cargo compartment floor to the second aircraft cargo compartment floor panel initial temperature in response to the determined phase of flight. The methods outlined in FIG. 18 can employ the apparatuses and systems set forth herein and described at least in FIGS. 1, 2A, 2B, 3, 4A-4B, 5, 6A, 6B, and 7-10.

FIG. 19 is a representative illustration outlining a present system 200 incorporating the aircraft cargo floor panels described herein. As shown in FIG. 19, aircraft cargo compartment floor panels, according to present aspects, can be resistance heated mats/floor panels 202 are positioned throughout and otherwise incorporated into selected locations over, within, and/or beneath an aircraft cargo compartment floor structure. According to a present aspect, the floor panels that can be activated to emanate heat can be a flooring material and/or can be a mat placed over selected locations of the cargo compartment floor structure. Floor panels 202 are in communication with thermocouples 204 and power supply disconnects 206. Via control wiring 208, the thermocouples 204 are in communication with at least one system controller 209 that is in communication with aircraft level control methodology 210 that can inform the system of an aircraft phase of flight, and at least one controller 208 is further in communication with a power supply module 212. The power supply disconnects 206, via power supply wiring 214, is in communication with the power supply module 212. A human interface 216 is shown as capable of inputting information regarding an aircraft phase of flight to system 200. However, a processor can deliver information regarding the phase of flight to system 200, for example in an automated process. Further, the human interface and/or the processor can be located on the aircraft, or can be remotely located and in communication with system 200 via wireless or other communication technology, as disclosed herein.

FIG. 20 is a block diagram outlining further aspects of system 200, and further describing presently disclosed aspects. As shown in FIG. 20, system 220 generates a system operational selection signal 222 that is sent to or that is otherwise incorporated into an aircraft controller logic circuit 224 that generates system status signals 226 that can be read via a system status visual indication 226 at an operator station readout. The aircraft controller circuit 224 sends signals 225 to a system controller 228 in communication with system function execution 230 that can be automatically effected to send a cargo floor temperature signal 232 to aircraft controller logic circuit 224.

According to a present aspect, in operation FIG. 21 outlines one example of a present logic circuit 240 where, in an operational mode 242 the present heated floor panel system is monitored, activated, and run for the purpose of activating and monitoring individual aircraft cargo compartment floor panels that are in communication with and are otherwise incorporated into present systems. Stage 244 contemplates the auto selection of one or more aircraft cargo compartment floor panels 246 that can be individually monitored, activated, and otherwise controlled for the purpose of delivering a defined and alterable amount of heat, with the activation and monitoring capable of maintaining a floor panel temperature at a selected temperature within a selected floor panel temperature range, and in response to a perceived phase of flight. According to logic circuit 248, temperature of selected aircraft cargo compartment floor panel temperatures (e.g., initial floor panel temperatures determined, for example, at an initial flight phase that can be "pre-takeoff")) can be monitored and otherwise determined, for example, by temperature sensors having the ability to generate temperature signals to the circuit. As the floor panel temperatures are monitored for any changes in temperature (e.g. a floor panel temperature decrease, etc.), the system can be activated via operator command, or automatically to turn "on" one or more selected aircraft cargo compartment floor panels for the purpose of delivering current from a power source to heating elements within the floor panels for the purpose of increasing a monitored floor panel temperature (that can be an initial floor panel temperature) to a selected, increased, floor panel temperature; or for the purpose of maintaining a floor panel temperature at a selected temperature that is can be close to an initial floor panel temperature, but that required heated floor panel activation to maintain a selected temperature, as ambient temperatures surrounding the aircraft (and even temperatures in regions surrounding the floor panels within the cargo compartment significantly decrease during a phase of flight at a particular flight altitude. The floor panels are monitored substantially continuously throughout varying phases of flight during a flight duration, and are adjusted according to program and in response to changing phases of flight for purposes that can include maintaining particular cargo at optimal temperatures during flight, including during and in response to changing phases of flight.

The term "substantially" as used herein means that a particular characteristic, parameter, or value does not need to be exactly achieved. Rather, deviations or variations, including, for example, tolerances, measurement error, measurement accuracy limitations, and other factors known to those skilled in the field, may occur in amounts that do not preclude the effect that the characteristic was intended to provide.

The present invention may of course, be carried out in other ways than those specifically set forth herein without departing from essential characteristics of aspects of the present disclosure. The present aspects are to be considered in all respects as illustrative and not restrictive, and all changes coming within the meaning and equivalency range of the appended claims are intended to be embraced therein.

What is claimed is:

1. A method for controlling temperature of a selected aircraft cargo region of an aircraft cargo compartment in an aircraft the method comprising:

monitoring with a thermal sensor a first aircraft cargo compartment floor initial temperature of a first aircraft cargo compartment floor configured within an aircraft cargo bay of an aircraft, said first aircraft cargo compartment floor comprising at least one first aircraft cargo compartment floor panel, said at least one first aircraft cargo compartment floor panel comprising a first aircraft cargo compartment floor panel initial temperature, said first aircraft cargo compartment floor panel initial temperature determined prior to at least one of cargo loading and aircraft takeoff, said at least one first aircraft cargo compartment floor panel further comprising a first aircraft cargo compartment floor panel heating element, said at least one first aircraft cargo compartment floor panel comprising said first aircraft cargo compartment floor panel heating element recessed into the first aircraft cargo compartment floor, said at least one first aircraft cargo compartment floor panel comprising a top surface of said first aircraft cargo compartment floor panel, said top surface of said first aircraft cargo compartment floor panel configured to be substantially flush and substantially even with the first aircraft compartment floor surrounding the at least one first aircraft cargo compartment floor panel;

determining with a phase of flight sensor a phase of flight to obtain a determined phase of flight, said phase of flight sensor configured to receive a signal from at least one of an altimeter, a pressure sensing device, a flight record timing device, and a computer program;

activating, in real time, the first aircraft cargo compartment floor panel heating element in response to the determined phase of flight, said first aircraft cargo compartment floor panel heating element in communication with the at least one first aircraft cargo compartment floor panel; and maintaining during flight the at least one first aircraft cargo compartment floor panel at a selected temperature within a first aircraft cargo compartment floor selected temperature range.

2. The method of claim 1, further comprising:

altering the first aircraft cargo compartment floor initial temperature to a selected temperature within the first aircraft cargo compartment floor selected temperature range.

3. The method of claim 2, further comprising:

detecting with a thermal sensor a change in the first aircraft cargo compartment floor initial temperature during the determined phase of flight; and maintaining the first aircraft cargo compartment floor panel selected temperature to maintain a first aircraft cargo compartment selected temperature within the first aircraft cargo compartment selected temperature range in response to the determined phase of flight.

4. The method of claim 1, further comprising:

altering the first aircraft cargo compartment floor initial temperature to a selected temperature within the first aircraft cargo compartment floor selected temperature range in response to the determined phase of flight.

5. The method of claim 1, further comprising:

monitoring with a thermal sensor a second aircraft cargo compartment floor initial temperature of a second aircraft cargo compartment floor in a second aircraft cargo compartment configured within an aircraft cargo bay, said second aircraft cargo compartment floor comprising at least one second aircraft cargo compartment floor panel, said second aircraft cargo compartment floor panel comprising a second aircraft cargo compartment floor panel initial temperature, said second aircraft cargo compartment floor panel initial temperature determined prior to at least one of cargo loading and aircraft takeoff, said at least one second aircraft cargo compartment floor panel further comprising a second aircraft cargo compartment floor panel heating element, said second aircraft cargo compartment floor panel comprising a top surface of the second aircraft cargo compartment floor panel, said top surface of the second aircraft cargo compartment floor panel configured to be substantially flush and substantially even with the second aircraft compartment floor surrounding the at least one second aircraft cargo compartment floor panel;

activating the second aircraft cargo compartment floor panel heating element, said second aircraft cargo compartment floor panel heating element in communication with the at least one second aircraft cargo compartment floor panel; and altering the second aircraft cargo compartment floor panel initial temperature to a second aircraft cargo compartment floor panel selected temperature, said second aircraft cargo compartment floor panel selected temperature within a second aircraft cargo compartment floor panel selected temperature range.

6. The method of claim 5, further comprising:

maintaining the second aircraft cargo compartment floor panel selected temperature of the at least one second aircraft cargo compartment floor panel within the second aircraft cargo compartment floor panel selected temperature range in response to the determined phase of flight.

7. The method of claim 5, further comprising:

altering the second aircraft cargo compartment floor panel initial temperature to a second aircraft cargo compartment floor panel selected temperature in response to the determined phase of flight.

8. The method of claim 5, further comprising:

detecting with a thermal sensor a change in the second aircraft cargo compartment floor initial temperature during the determined phase of flight; and altering the second aircraft cargo compartment floor panel selected temperature to maintain the second aircraft cargo compartment floor panel selected temperature within the second aircraft cargo compartment floor panel selected temperature range in response to the determined phase of flight.

9. The method of claim 5, wherein the first aircraft cargo compartment floor panel selected temperature is different from the second aircraft cargo compartment floor panel selected temperature.

10. A system for selectively regulating an aircraft cargo compartment floor temperature of an aircraft cargo compartment floor region in an aircraft cargo compartment in an aircraft, the system comprising:

a first aircraft cargo compartment, said first aircraft cargo compartment configured within the aircraft, said first aircraft cargo compartment comprising a first aircraft cargo compartment floor having a first cargo compartment available floor area, said first aircraft cargo compartment floor comprising:

at least one first aircraft cargo compartment floor region, said at least one first aircraft cargo compartment floor region comprising at least one first aircraft cargo compartment floor panel, each of said at least one first aircraft cargo compartment floor panel comprising a first aircraft cargo compartment floor panel initial temperature, said first aircraft cargo compartment floor panel initial temperature determined prior to at least one of cargo loading and aircraft takeoff, each of said at least one first aircraft cargo compartment floor panel further comprising a first aircraft cargo compartment floor panel heating element, said first aircraft cargo floor region comprising 25% to about 95% of the first cargo compartment available floor area;

a first aircraft cargo compartment floor temperature sensor, said first aircraft cargo compartment floor temperature sensor in communication with the at least one first aircraft cargo compartment floor panel;

a phase of flight sensor, said phase of flight sensor configured to determine a phase of flight;

a controller in communication with said at least one of the first aircraft cargo compartment floor panel, the phase of flight sensor, and the first aircraft cargo compartment floor temperature sensor; and a power source, said power source in communication with said first aircraft cargo compartment floor panel heating element; and wherein said at least one first aircraft cargo compartment floor panel comprising said first aircraft cargo compartment floor panel heating element is recessed into the first aircraft cargo compartment floor, said at least one first aircraft cargo compartment floor panel comprising a top surface of said first aircraft cargo compartment floor panel, said top surface of the first aircraft cargo compartment floor panel configured to be substantially flush and substantially even with the first aircraft compartment floor surrounding the at least one first aircraft cargo compartment floor panel.

11. The system of claim 10, said system further comprising:

a second aircraft cargo compartment configured within the aircraft, said second aircraft cargo compartment comprising a second aircraft cargo compartment floor having a second cargo compartment available floor area, said second aircraft cargo compartment floor comprising:

at least one second aircraft cargo compartment floor region, said at least one second aircraft cargo compartment floor region comprising at least one second aircraft cargo compartment floor panel, each of said at least one second aircraft cargo compartment floor panel comprising a second aircraft cargo compartment floor panel initial temperature, said second aircraft cargo compartment floor panel initial temperature determined prior to at least one of cargo loading and aircraft takeoff, each of said at least one second aircraft cargo compartment floor panel further comprising a second aircraft cargo compartment floor panel heating element, said second aircraft cargo floor region comprising 25% to about 95% of the second cargo compartment available floor area;

a second aircraft cargo compartment floor temperature sensor, said second aircraft cargo compartment floor temperature sensor in communication with the at least one the second aircraft cargo compartment floor panel;

wherein said controller is further in communication with at least one of of said at least one second aircraft cargo compartment floor panel, said phase of flight sensor, and said second aircraft cargo compartment floor temperature sensor;

wherein said power source is further in communication with said second aircraft cargo compartment floor panel heating element; and wherein said at least one second aircraft cargo compartment floor panel comprising said second aircraft cargo compartment floor panel heating element is recessed into the second aircraft cargo compartment floor, said at least one second aircraft cargo compartment floor panel comprising a top surface of said at least one second aircraft cargo compartment floor panel, said top surface of the at least one second aircraft cargo compartment floor panel configured to be substantially flush and substantially even with the second aircraft compartment floor surrounding the at least one second aircraft cargo compartment floor panel.

12. The system of claim 11, said system further comprising:

a processor, said processor in communication with said controller.

13. The system of claim 11, wherein the system is configured to maintain the first second aircraft cargo compartment floor panel initial temperature in response to a determined phase of flight and wherein the system is further configured to maintain the second aircraft cargo compartment floor panel initial temperature in response to the determined phase of flight.

14. The system of claim 11, wherein said first aircraft cargo compartment floor panel initial temperature is different from said second aircraft cargo compartment floor panel initial temperature.

15. The system of claim 11, further comprising at least one cargo compartment partition, said at least one cargo compartment partition configured to separate the first aircraft cargo compartment from the second aircraft cargo compartment.

16. The system of claim 10, said system further comprising:

a processor, said processor in communication with said controller.

17. The system of claim 10, wherein the system is configured to maintain the first aircraft cargo compartment floor panel initial temperature in response to a determined phase of flight.

18. An aircraft comprising:

a first aircraft cargo compartment, said first aircraft cargo compartment configured within an aircraft, said first aircraft cargo compartment comprising a first aircraft cargo compartment floor, said first aircraft cargo compartment floor comprising:

at least one first aircraft cargo compartment floor region, said at least one first aircraft cargo compartment floor region comprising at least one first aircraft cargo compartment floor panel, said at least one first aircraft cargo compartment floor panel comprising a first aircraft cargo compartment floor panel initial temperature, said at least one first aircraft cargo compartment floor panel initial temperature determined prior to at least one of cargo loading and aircraft takeoff, said at least one first aircraft cargo compartment floor panel further comprising a first aircraft cargo compartment floor panel heating element;

a first aircraft cargo compartment floor temperature sensor, said first aircraft cargo compartment floor temperature sensor in communication with the at least one first aircraft cargo compartment floor panel;

a phase of flight sensor, said phase of flight sensor configured to determine a phase of flight;

a controller in communication with said at least one of the at least one first aircraft cargo compartment floor panel, the phase of flight sensor, and the first aircraft cargo compartment floor temperature sensor;

a power source, said power source in communication with said first aircraft cargo compartment floor panel heating element; and wherein said at least one first aircraft cargo compartment floor panel comprises a top surface of said first aircraft cargo compartment floor panel said first aircraft cargo compartment floor panel is recessed into the first aircraft cargo compartment floor, said at least one first aircraft cargo compartment floor panel comprising said first aircraft cargo compartment floor panel, said top surface of said first aircraft cargo compartment floor panel configured to be substantially flush and substantially even with the first aircraft compartment floor surrounding the at least one first aircraft cargo compartment floor panel.

19. The aircraft of claim 18, said aircraft further comprising:

a second aircraft cargo compartment configured within the aircraft, said second aircraft cargo compartment comprising:

at least one second aircraft cargo compartment floor region, said at least one second aircraft cargo compartment floor region comprising at least one second aircraft cargo compartment floor panel, said at least one second aircraft cargo compartment floor panel comprising a second aircraft cargo compartment floor panel initial temperature, said at least one second aircraft cargo compartment floor panel initial temperature determined prior to at least one of cargo loading and aircraft takeoff, said at least one second aircraft cargo compartment floor panel further comprising a second aircraft cargo compartment floor panel heating element;

a second aircraft cargo compartment floor temperature sensor, said second aircraft cargo compartment floor temperature sensor in communication with the at least one the at least one second aircraft cargo compartment floor panel;

wherein said controller is further in communication with at least one of said at least one second aircraft cargo compartment floor panel, said phase of flight sensor, and said second aircraft cargo compartment floor temperature sensor;

wherein said power source is further in communication with said second aircraft cargo compartment floor panel heating element; and wherein said at least one second aircraft cargo compartment floor panel comprises said second aircraft cargo compartment floor panel recessed into the second aircraft cargo compartment floor, said at least one second aircraft cargo compartment floor panel comprises a top surface of said second aircraft cargo compartment floor panel, said top surface of said second aircraft cargo compartment floor panel configured to be substantially flush and substantially even with the second aircraft compartment floor surrounding the at least one second aircraft cargo compartment floor panel.

20. The aircraft of claim 19, wherein said aircraft further comprises at least one partition, said at least one partition configured to separate the first aircraft cargo compartment from the second aircraft cargo compartment.

* * * * *